(12) United States Patent
Sauder

(10) Patent No.: US 9,351,440 B2
(45) Date of Patent: May 31, 2016

(54) SEED METER DISC HAVING AGITATION CAVITIES

(75) Inventor: Derek A. Sauder, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 216 days.

(21) Appl. No.: 14/006,569

(22) PCT Filed: Mar. 22, 2012

(86) PCT No.: PCT/US2012/030192
§ 371 (c)(1),
(2), (4) Date: Sep. 20, 2013

(87) PCT Pub. No.: WO2012/129442
PCT Pub. Date: Sep. 27, 2012

(65) Prior Publication Data
US 2014/0007801 A1    Jan. 9, 2014

Related U.S. Application Data

(60) Provisional application No. 61/466,047, filed on Mar. 22, 2011.

(51) Int. Cl.
*A01C 7/04* (2006.01)
*A01C 7/12* (2006.01)
*A01C 7/08* (2006.01)
*A01C 7/10* (2006.01)

(52) U.S. Cl.
CPC . *A01C 7/046* (2013.01); *A01C 7/04* (2013.01); *A01C 7/044* (2013.01); *A01C 7/084* (2013.01); *A01C 7/105* (2013.01); *A01C 7/12* (2013.01); *A01C 7/128* (2013.01)

(58) Field of Classification Search
USPC ................... 111/183–185; 221/211
See application file for complete search history.

(56) References Cited

U.S. PATENT DOCUMENTS

| | | | |
|---|---|---|---|
| 5,170,909 A | 12/1992 | Lundie et al. | |
| 5,839,378 A | 11/1998 | Stufflebeam et al. | |
| 6,325,005 B1 | 12/2001 | Crabb et al. | |
| 6,347,595 B1 * | 2/2002 | de Morais | A01C 7/046 111/174 |
| 6,352,042 B1 | 3/2002 | Martin et al. | |
| 6,401,638 B1 | 6/2002 | Crabb et al. | |

(Continued)

FOREIGN PATENT DOCUMENTS

| | | | | |
|---|---|---|---|---|
| DE | 2701982 A1 * | 10/1978 | | A01C 7/046 |
| DE | EP 0237766 A1 * | 9/1987 | | A01C 7/046 |

(Continued)

OTHER PUBLICATIONS

Kinze Manufacturing, EdgeVac Operator & Parts Manual, Williamsburg Iowa, Mar. 2007.

*Primary Examiner* — Alicia Torres
(74) *Attorney, Agent, or Firm* — Thomas J. Oppoid; Larkin Hoffman Daly & Lindgren, Ltd.

(57) ABSTRACT

A seed meter for an agricultural planter in which the seed disc is rotatably mounted within a seed meter housing. As the seed disc rotates, the apertures in the disc rotate along a seed aperture path through a horizontally adjacent seed pool area. The seed disc includes cavities disposed along the seed aperture path to agitate the seeds in the seed pool area. A singulator having multiple co-planar singulator surfaces is biased against the seed side surface of the seed disc.

14 Claims, 24 Drawing Sheets

(56) References Cited

U.S. PATENT DOCUMENTS

| | | |
|---|---|---|
| 6,516,733 B1 | 2/2003 | Sauder |
| 7,152,542 B2 | 12/2006 | Eben et al. |
| 7,334,532 B2 | 2/2008 | Sauder et al. |
| 7,404,366 B2 * | 7/2008 | Mariman ............ A01C 7/046 111/185 |
| 7,448,334 B2 | 11/2008 | Mariman et al. |
| 2002/0170476 A1 | 11/2002 | Bogner et al. |
| 2003/0183647 A1 * | 10/2003 | Ven Huizen ........... A01C 7/046 221/211 |
| 2005/0150442 A1 | 7/2005 | Friesen |
| 2007/0125284 A1 | 6/2007 | Mariman |
| 2011/0132721 A1 * | 6/2011 | Kevin ............... B65B 35/28 198/349 |

FOREIGN PATENT DOCUMENTS

| | | |
|---|---|---|
| EP | 0237766 B1 | 6/1990 |
| EP | 2225928 A2 | 9/2010 |
| WO | 2010002754 A1 | 1/2010 |

* cited by examiner

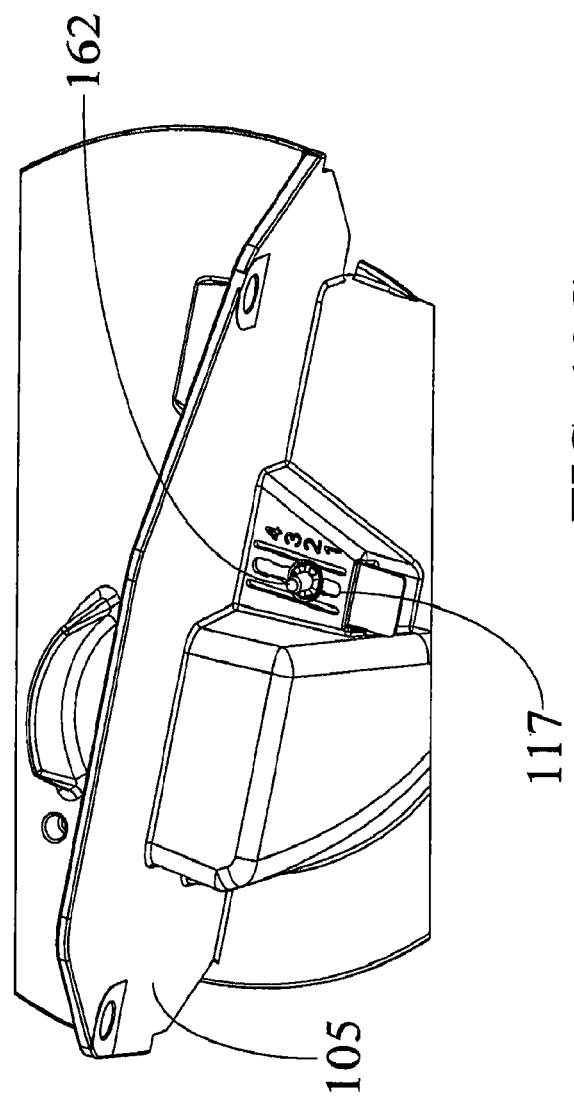

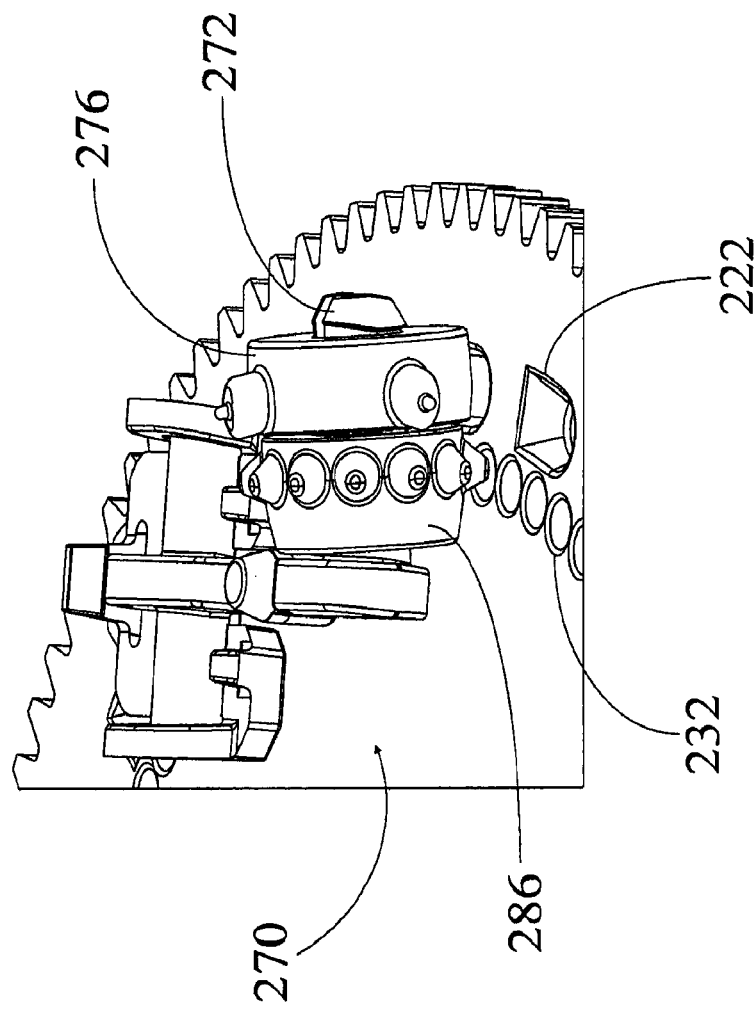

SEC. X-X

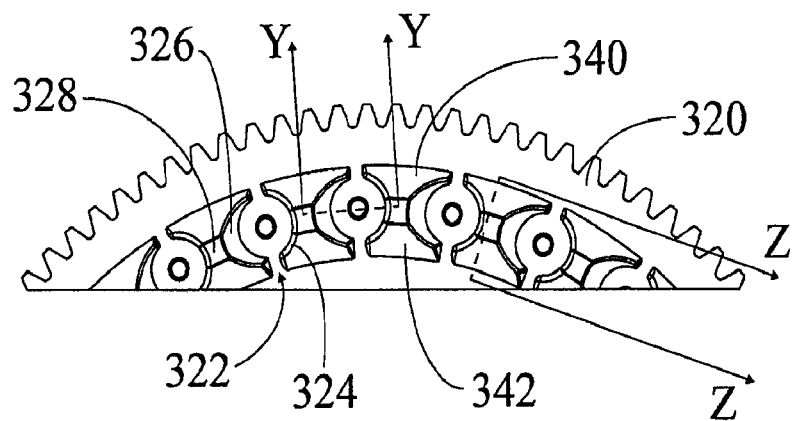
FIG. 20A
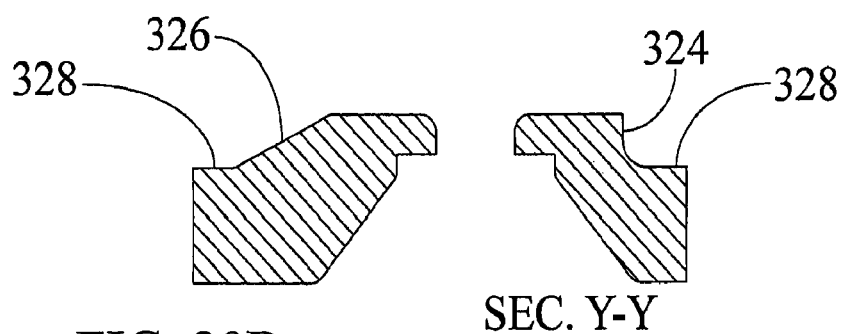
FIG. 20B  SEC. Y-Y
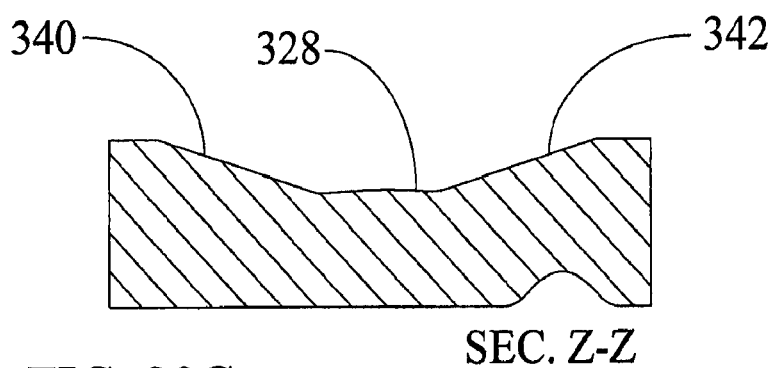
FIG. 20C  SEC. Z-Z

US 9,351,440 B2

SEED METER DISC HAVING AGITATION CAVITIES

CROSS-REFERENCE TO RELATED APPLICATIONS

This applications claims the benefit of U.S. Provisional Application No. 61/466,047, filed Mar. 22, 2011.

BACKGROUND

In recent years, growers of corn and other crops have come to recognize the importance of planting individual seeds at the appropriate spacing due to increased seed and crop input prices, but also because they have the ability to monitor the economic impact of skips, doubles or misplaced seeds using modern planter monitors. For these reasons modern seed meters have been developed that include features which improve the singulation of seeds. However, each added feature increases the amount of time that the grower must spend replacing wear parts or making other adjustments prior to or during planting operations. Due to weather and other factors, the available time to plant corn and other crops is often extremely limited, with each planter required to cover hundreds of acres while limited in speed due to reduced seed meter performance at higher planting speeds.

Thus, there is a need for a seed meter having improved singulation and seed spacing capability at higher speeds and which is also easily repairable and modifiable.

BRIEF DESCRIPTION OF THE DRAWINGS

FIG. 13C is a partial perspective view of an embodiment of a seed meter.

FIG. 18B is a side elevation view of an embodiment of a seed disc and an embodiment of an ejector wheel assembly.

FIG. 20A is a partial side elevation view of another embodiment of a seed disc.

FIG. 20B is a cross-sectional view of a seed disc along the section Y-Y of FIG. 20A.

FIG. 20C is a cross-sectional view of a seed disc along the section Z-Z of FIG. 20B.

DESCRIPTION

Figure 1:
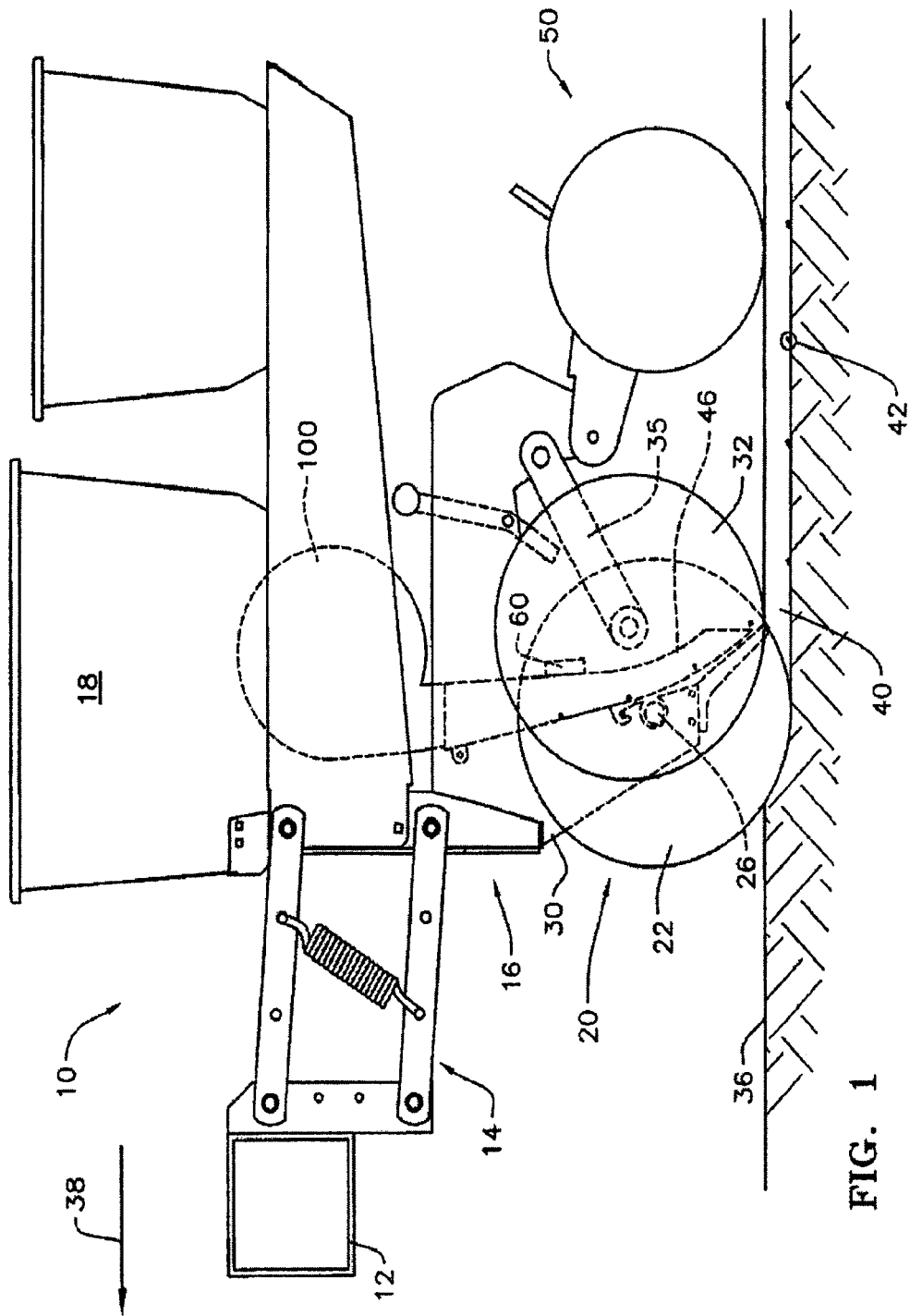
FIG. 1 illustrates a side elevation view of a single row unit of a conventional row crop planter.

Referring now to the drawings, wherein like reference numerals designate identical or corresponding parts throughout the several views, FIG. 1 illustrates a single row unit 10 of a conventional row crop planter. As is well known in the art, the row units 10 are mounted in spaced relation along the length of a transverse toolbar 12 by a parallel linkage 14 which permits each row unit 10 to move vertically independently of the toolbar and the other spaced row units in order to accommodate changes in terrain or upon the row unit encountering a rock or other obstruction as the planter is drawn through the field. Each row unit 10 includes a frame 16 which operably supports a seed hopper 18, a furrow opening assembly 20, a seed meter 100, a seed tube 46 and a furrow closing assembly 50.

The furrow opening assembly 20 comprises a pair of furrow opening discs 22 which are rotatably mounted on shafts 26 secured to a shank 30 comprising a part of the row unit frame 16. The furrow opening assembly 20 further comprises a pair of gauge wheels 32 rotatably supported by gauge wheel arms 35 also secured to the frame 16. As the planter is drawn through the field, the rotating furrow opening discs 22 cut a V-shaped furrow 40 through the soil surface 36. The egress end of the seed tube 46 is disposed between the rearwardly diverging furrow opening discs 22.

In operation, as the planter is drawn through the field along the direction of travel as indicated by the arrow 38, the seed hopper 18 communicates a constant supply of seeds 42 to the seed meter 100. The seed meter 100 meters or dispenses individual or "singulated" seeds 42 at regularly spaced intervals into the seed tube 46. The seed tube 46 directs the seeds downwardly and rearwardly between the diverging furrow opening discs 22 before depositing the seeds into the V-shaped furrow 40. The seeds are then covered with soil by the furrow closing assembly 50. A seed sensor 60 detects the passage of seeds through the seed tube 46 as is known in the art.

Novel Seed Meter Embodiments

Figure 2:
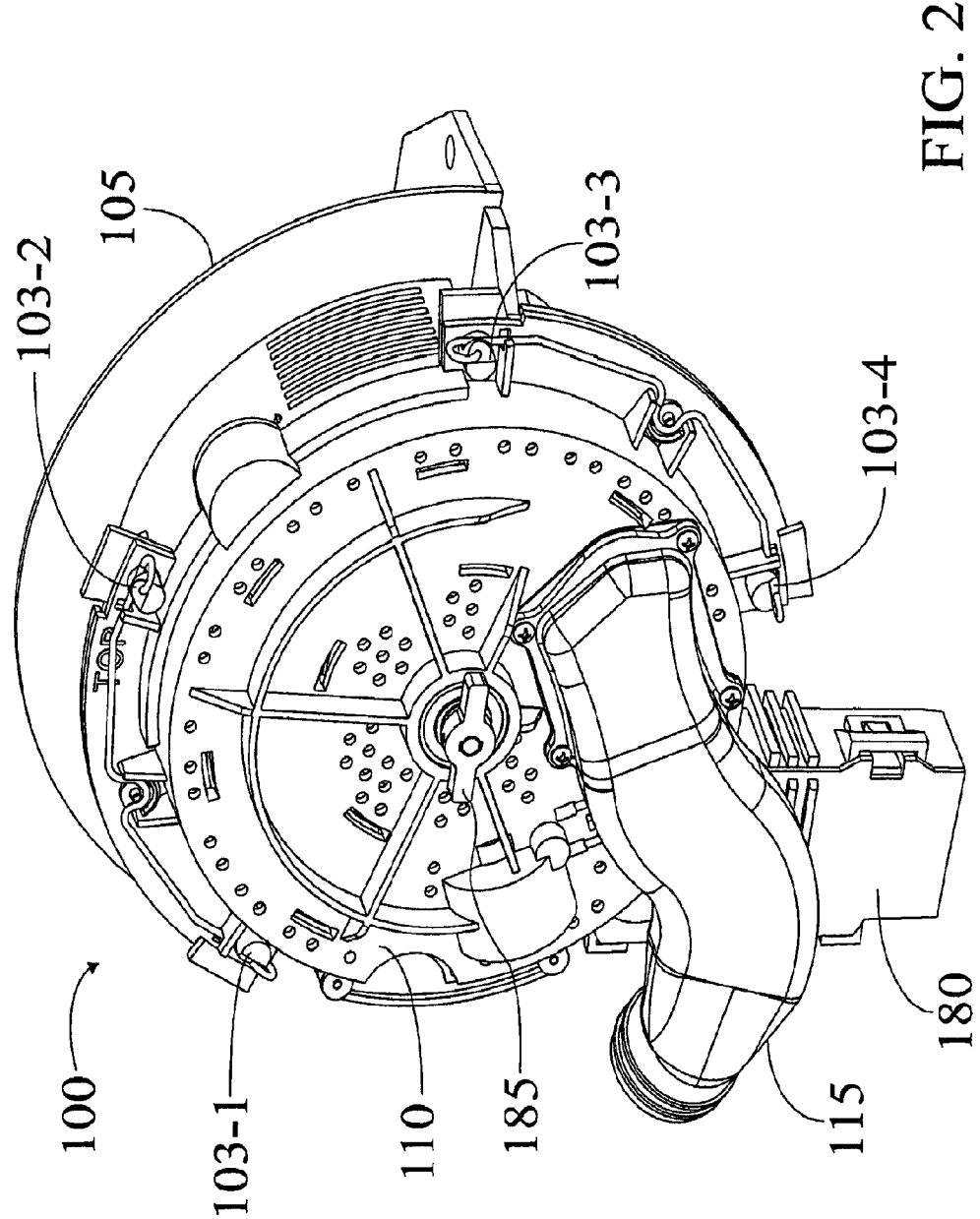
FIG. 2 is a perspective view of an embodiment of a seed meter.
Figure 3:
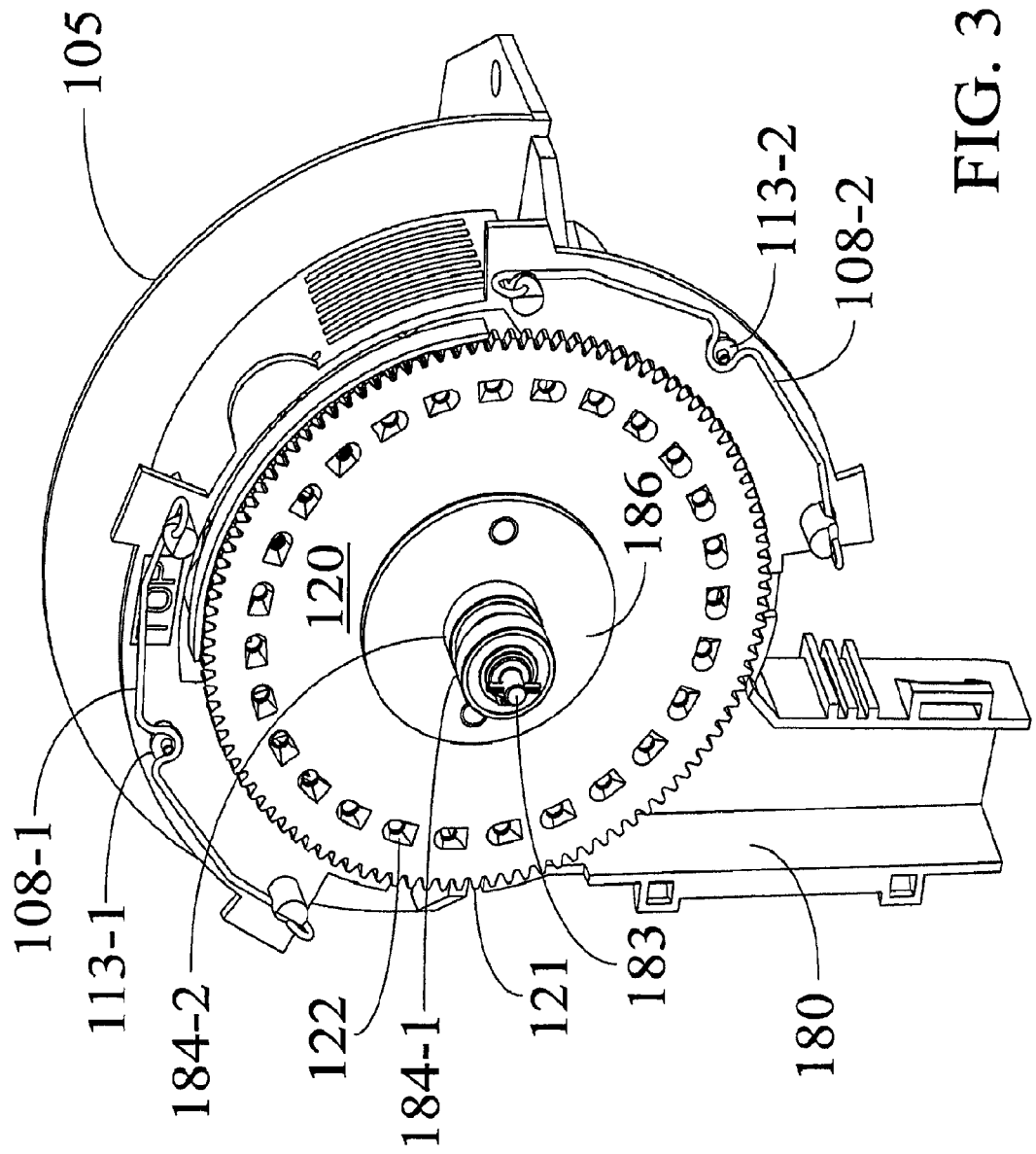
FIG. 3 is a partial perspective view of an embodiment of a seed meter.

Embodiments of a novel seed meter 100 are illustrated in FIGS. 2-20. Referring to FIGS. 2 and 3, the seed meter 100 includes a housing comprised of a vacuum cover 110 and a seed housing 105. As described further herein, the seed meter 100 functions by selecting one seed at a time from seeds communicated into the seed housing 105 and dispensing each seed through the seed exit 180. A vacuum inlet 115 is coupled to the vacuum cover 110. Vacuum hoses or tubes (not shown) connect the vacuum inlet 115 to a vacuum source (not shown) such as a vacuum impeller.

The seed housing 105 includes pivots 113 (FIG. 3) and tabs 103 (FIG. 2). When assembled, the tabs 103 extend through holes in the vacuum cover 110 such that retaining springs 108 may be biased against pivots 113 and tabs 103 to retain the seed housing 105 in position against the vacuum cover 110.

Referring to FIG. 3, the seed meter 100 is shown with the vacuum cover 110 and other components removed for clarity. A shaft 183 is rotatably coupled to bearings 184. Bearings 184 are held in place by the vacuum cover 110. A drive plate 186 is coupled to and rotates with the shaft 183. Drive plate 186 is releasably coupled to a seed disc 120. Seed disc 120 includes apertures 122 and preferably includes drive teeth 121. In operation, the seed disc 120 may be rotated by a driven gear (not shown) coupled to drive teeth 121 (as described further herein) or by a driven shaft (not shown) coupled to an adapter 185 (FIG. 2) mounted to the shaft 183.

Figure 4:
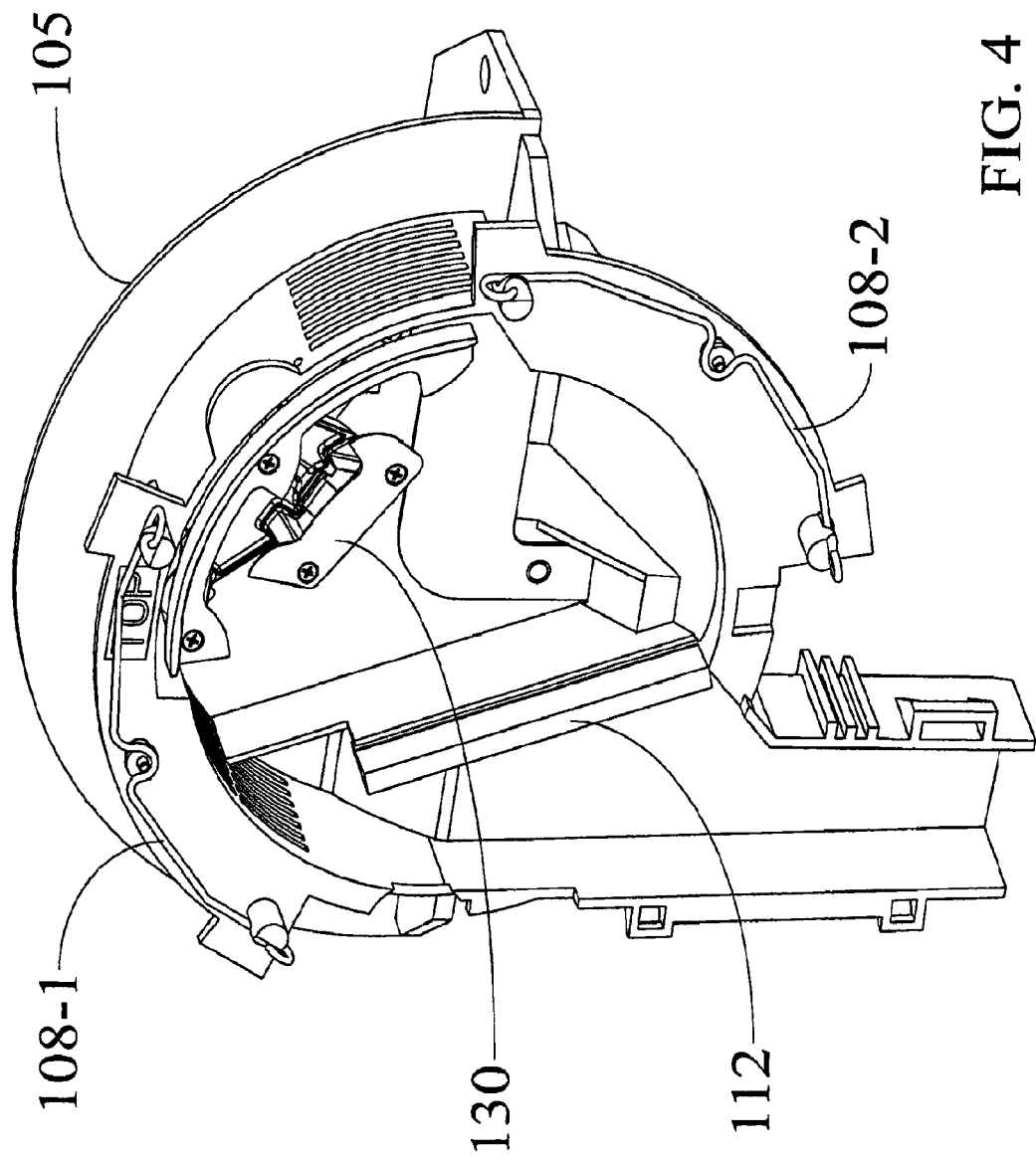
FIG. 4 is another partial perspective view of an embodiment of a seed meter.
Figure 5:
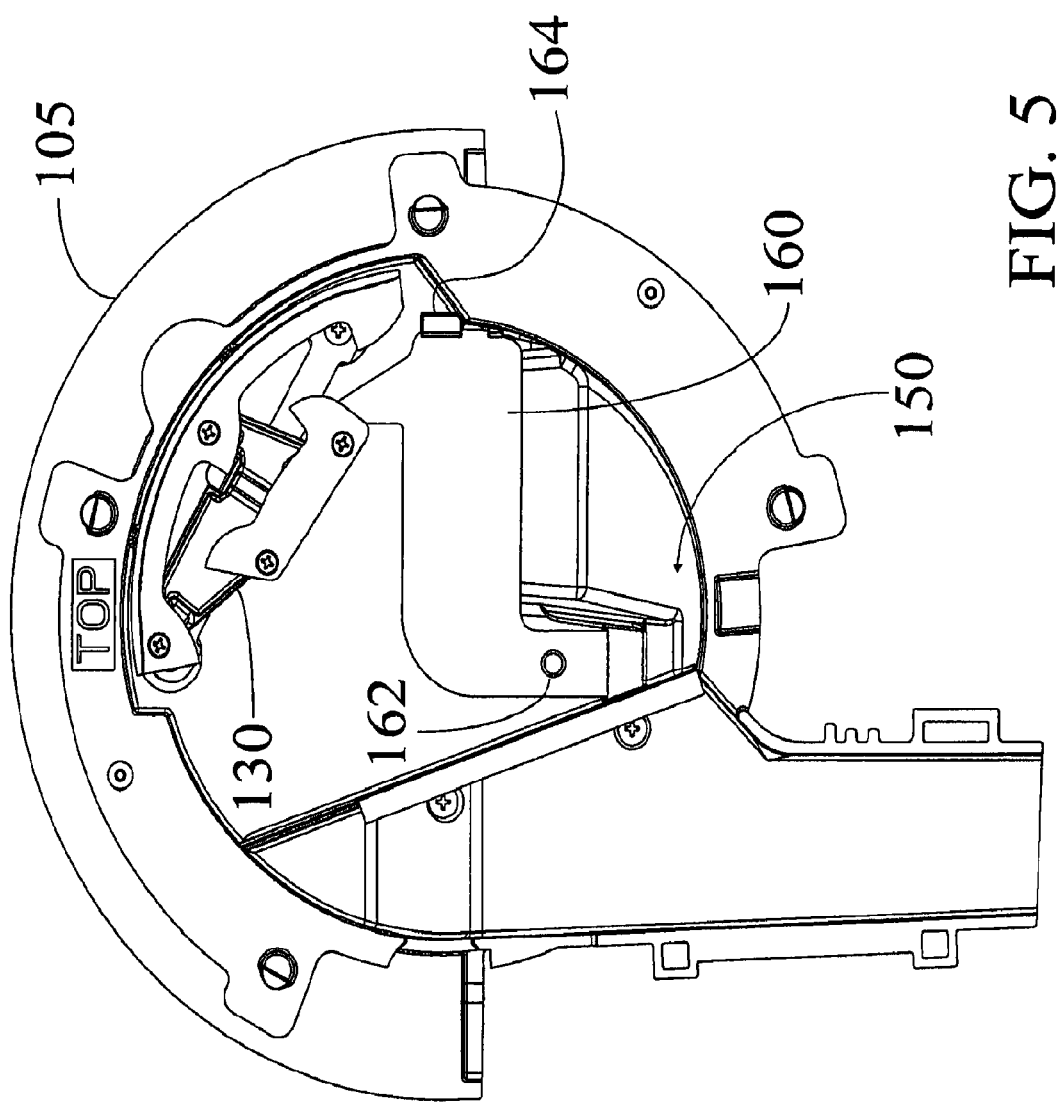
FIG. 5 is a partial side elevation view of an embodiment of a seed meter.

Turning to FIG. 4, the interior of the seed housing 105 is shown with the seed disc 120, drive shaft 183 and drive plate 186 removed. A brush 112 is mounted to seed housing 105 such that its bristles contact the seed-side surface of the seed disc 120. A singulator 130 is mounted to the seed housing 105 (as described further herein) which cooperates with the seed disc 120 to singulate the seeds before they are dispensed through the seed exit 180. The singulator preferably includes multiple singulator surfaces in contact with a seed side surface 140 of the seed disc 140.

Referring to FIGS. 5, 6, and 13A-C, seeds are communicated into the seed meter 100 beneath a baffle 160 mounted to the seed housing 105. A seed pool area 150 (FIG. 5) is disposed horizontally adjacent to the seed disc 120 near a bottom end of the seed housing 105 for collection of seeds communicated into the seed meter.

Figure 9:
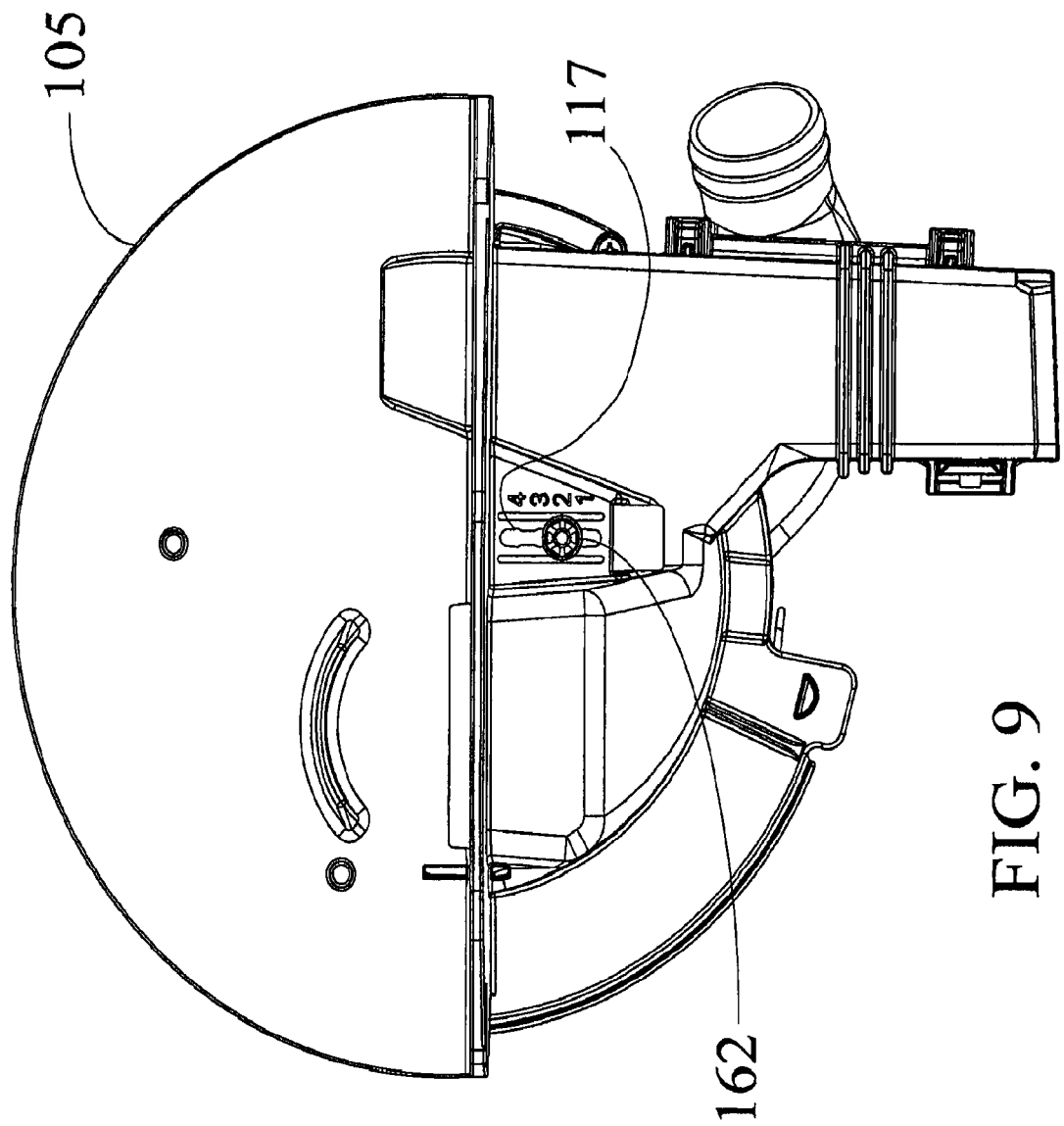
FIG. 9 is another side elevation view of an embodiment of a seed meter.

The height of baffle 160 may be adjusted along guides 164 and 166. The baffle 160 is mounted to the seed housing 105 by rivet 162, which extends outside the seed housing 105 (as best seen in FIGS. 9 and 13C) and may be moved vertically by the operator along a notched slot 117 without disassembling the housing. Each notch in slot 117 is sized to hold the rivet 162 in place such that the operator can select the height of baffle 160 by pushing the rivet up and down. As illustrated, visual indicators (e.g., numbers 1 through 4) are preferably located adjacent to the notches for positioning the rivet 162 at corresponding heights of the baffle 160 for ease of reference.

Removable Floating Singulator Embodiments

Figure 6:
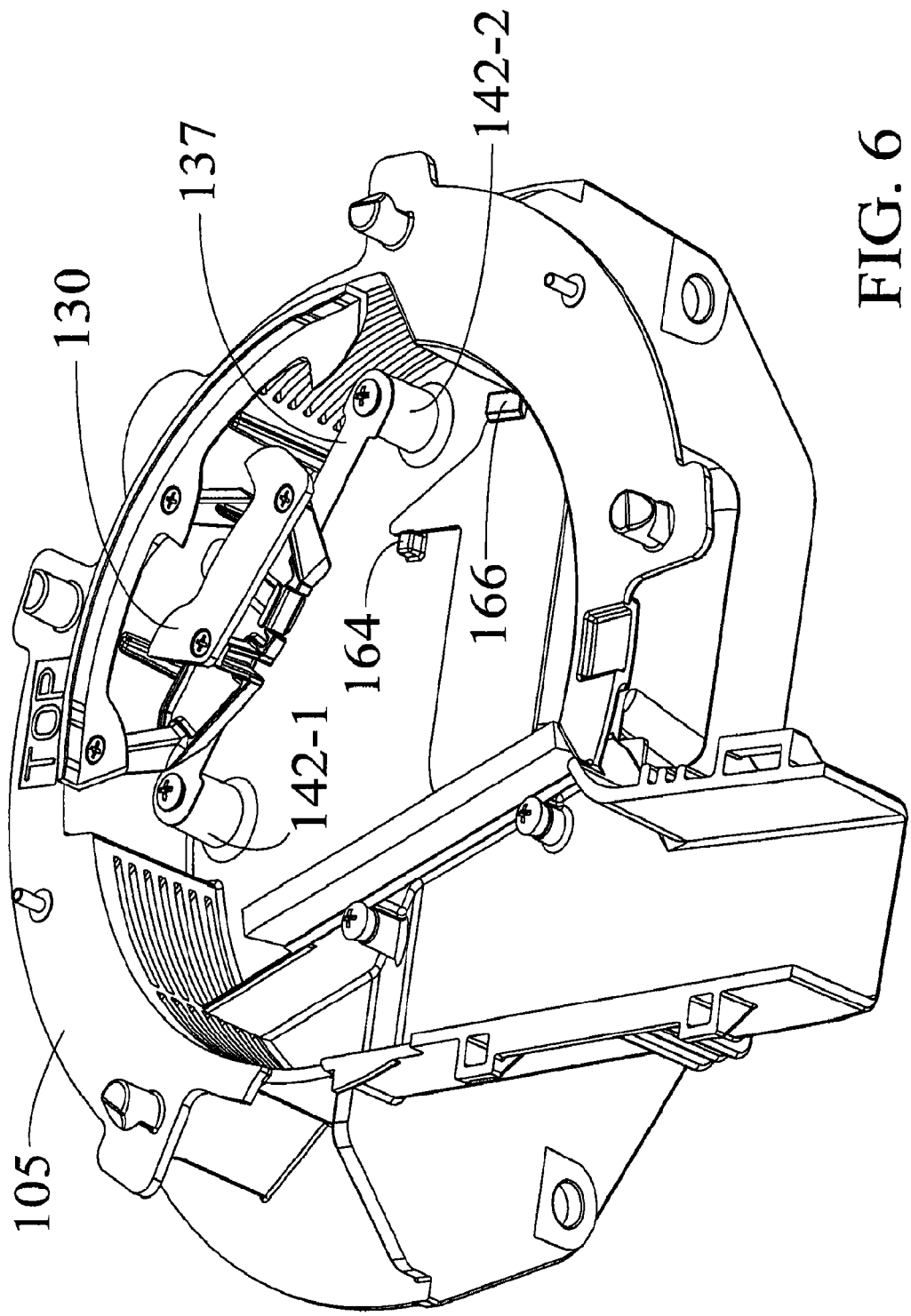
FIG. 6 is another partial perspective view of an embodiment of a seed meter.
Figure 7:
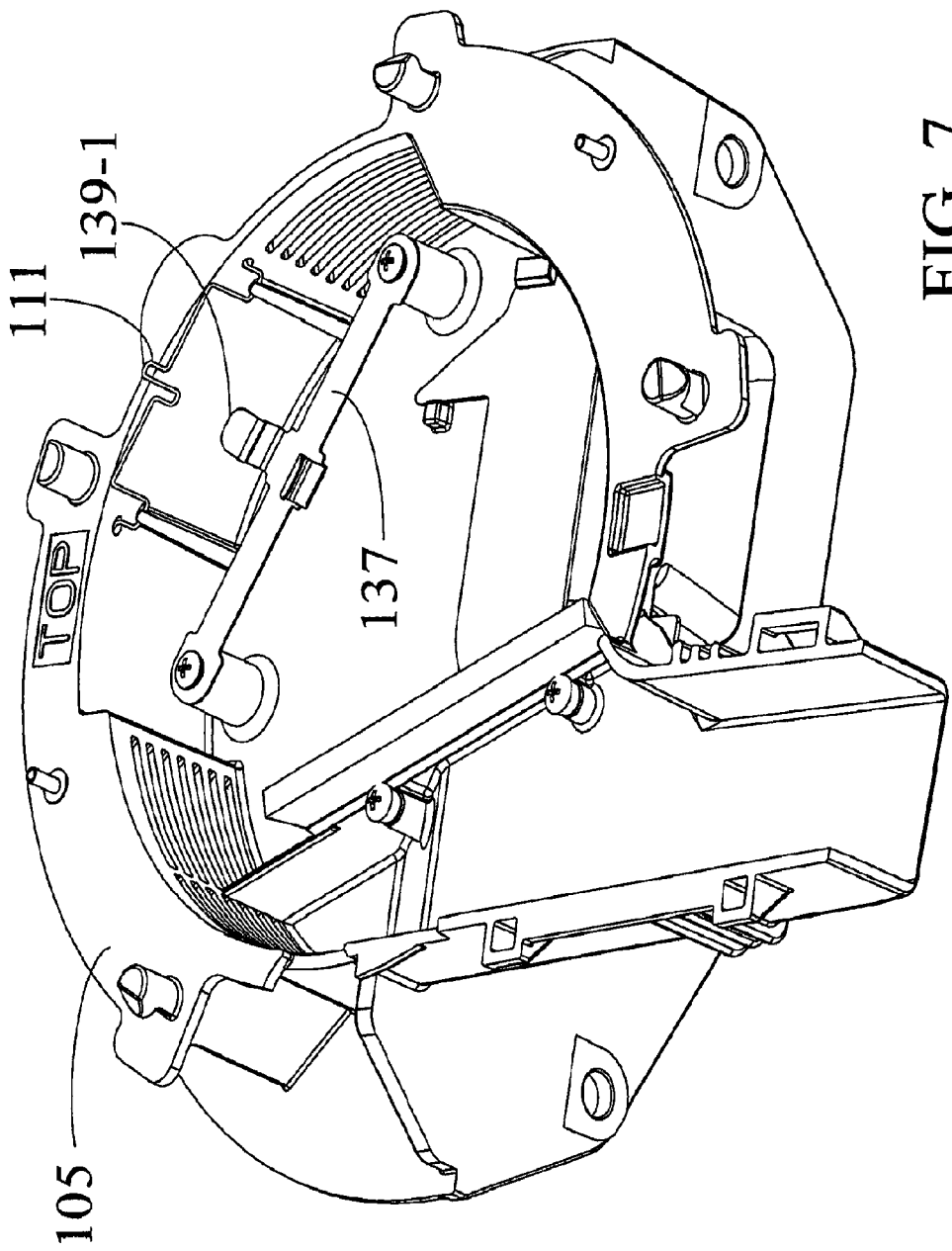
FIG. 7 is another partial perspective view of an embodiment of a seed meter.
Figure 8:
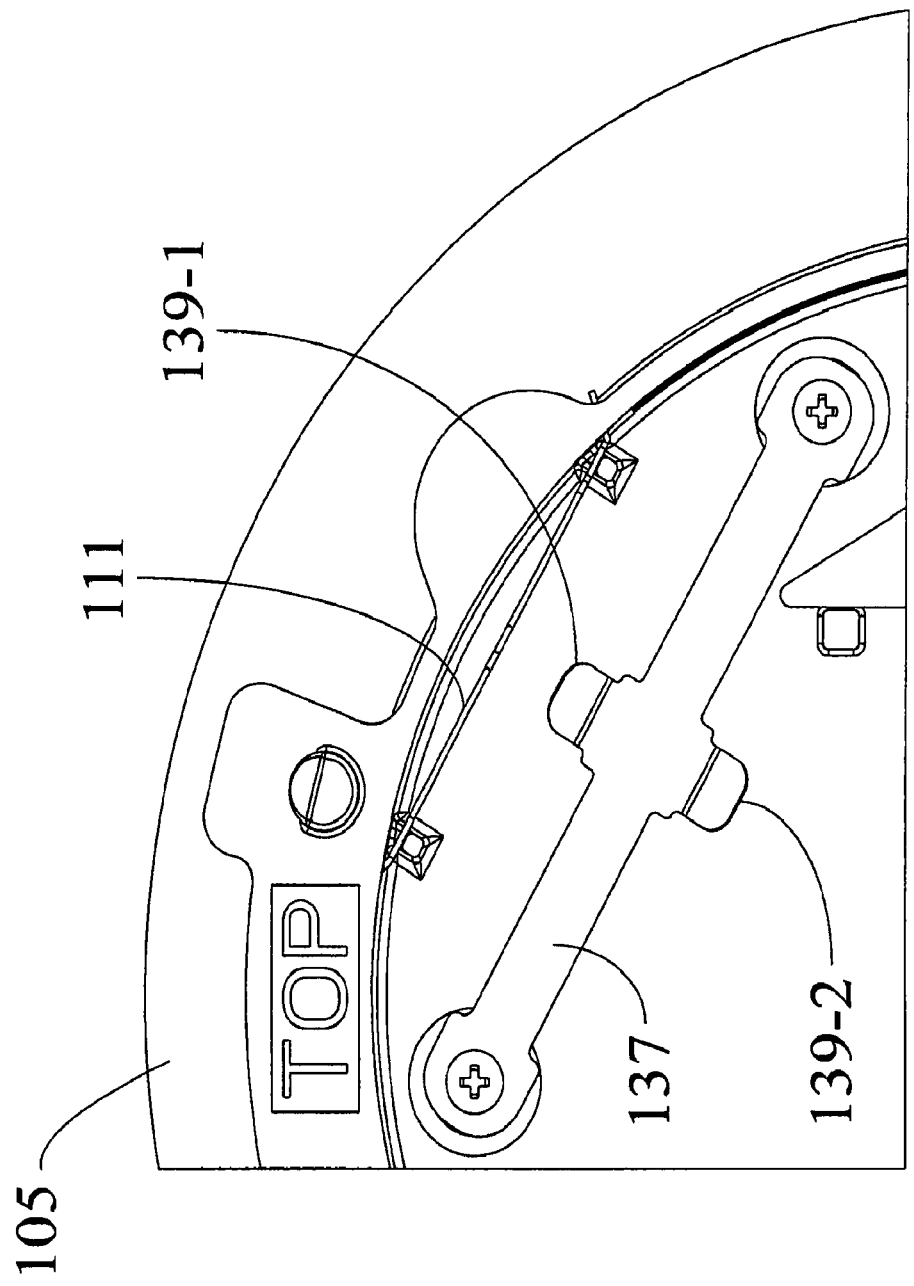
FIG. 8 is another side elevation view of an embodiment of a seed meter.

Referring to FIGS. 6-8, the singulator 130 is releasably mounted to the seed housing 105 so as to bias the singulator against the seed disc 120 while allowing the singulator to "float" both axially and longitudinally with respect to the axis of rotation of the seed disc. The singulator is releasably coupled to an axial spring 137 by attachment ears 139. The axial spring 137 is preferably made of a material (e.g., spring steel) which is elastically deformable. The axial spring 137 is mounted to bosses 142. The bosses 142 are sized such that the singulator 130 is biased against the face of the seed disc 120 when the seed disc is in its normal position. Thus, when the seed disc 120 is deflected axially away from the vacuum cover 110, the tension in axial spring 137 increases, allowing the singulator to remain in contact with the seed disc without interfering with the rotation of the seed disc. Likewise, when the seed disc is deflected axially toward the vacuum cover 110, the tension in axial spring 137 decreases such that the singulator remains in contact with the seed disc.

Radial spring 111 is mounted to the seed housing 105 such that in operation, the radial spring biases the singulator radially against the seed disc 120 when the seed disc is in its normal position.

Referring to FIGS. 12A-D, the singulator 130 is illustrated in detail attached to the axial spring 137. The singulator 130 includes base 133, arms 136, upper lobe plate 134 and lower lobe plate 132. The upper lobe plate 134 includes three singulation lobes, while the lower lobe plate 132 includes two singulation lobes. In operation, attachment ears 139 grasp the base 133. When the axial spring 137 is attached to the singulator 130, the attachment ears 139 extend past and away from the base 133 and are easily manipulated and deflected. It should be appreciated that other configurations of the singulator 130 could be used to achieve the objectives described herein.

It should be appreciated that the singulator 130 is easily replaceable with another singulator with a different lobe configuration for different seeds or if it is necessary to replace the singular due to wear on the singulator lobes. The singulator 130 is removable by pulling it away from the axial spring 137 with sufficient force that the attachment ears 139 deflect away from each other sufficiently to release the base 133. The attachment ears 139 may also be deflected away from each other with one hand while pulling the singulator 130 away from the axial spring 137 with the other. Likewise, the singulator 130 may be replaced by pressing the base 133 of the singulator between the attachment ears 139 with sufficient force to cause the attachment ears to deflect away from each other to allow the base of the singulator to pass between them. To replace the singulator, the base 133 may be pushed between the ears causing them to deflect away from one another before returning to the normal position in which the base of the singulator is again secured between the ears. In this way the singulator 130 may be easily removed and replaced by hand without the use of tools and without removing or changing the location of axial spring 137, which remains in the correct location to bias the singulator 130 against the seed disc 120 while allowing the singulator 130 to "float" with deflections or deformations of the seed disc.

Figure 10:
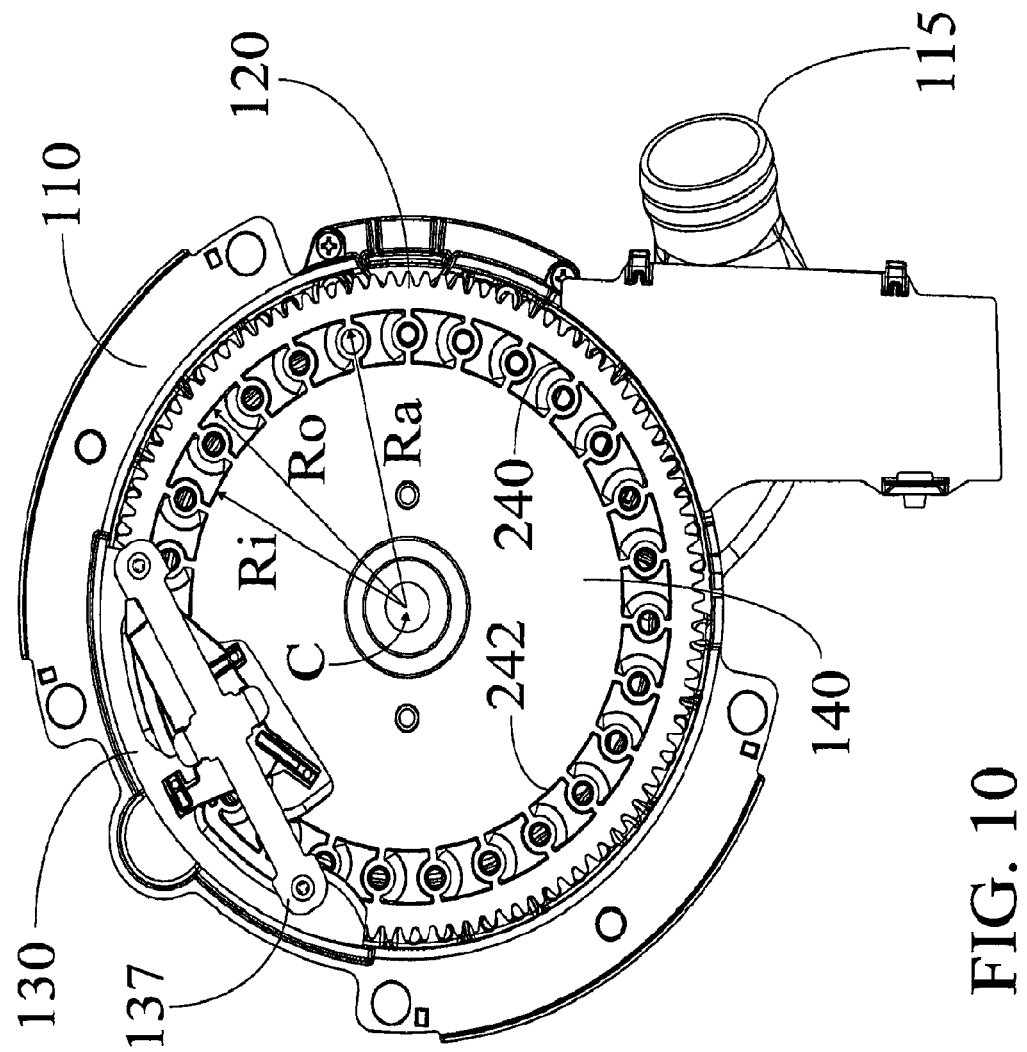
FIG. 10 is a partial side elevation view of an embodiment of a seed meter.
Figure 11:
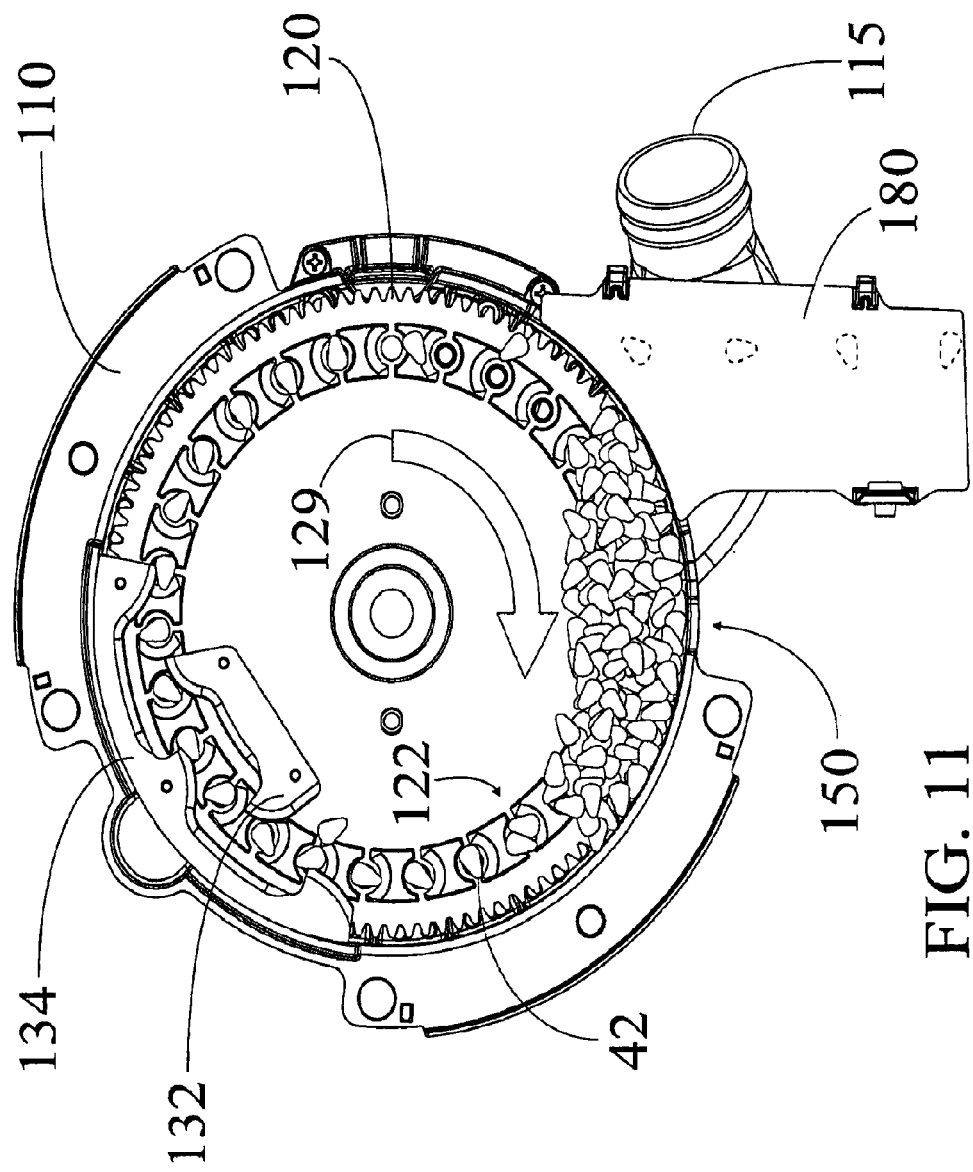
FIG. 11 is a partial side elevation view of an embodiment of a seed meter.
Figure 12B:
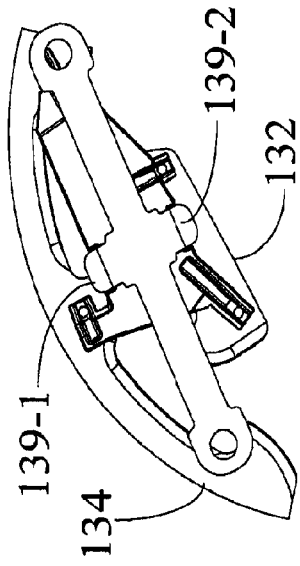
FIG. 12B is another perspective view of an embodiment of a seed singulator and an embodiment of an axial spring.
Figure 12A:
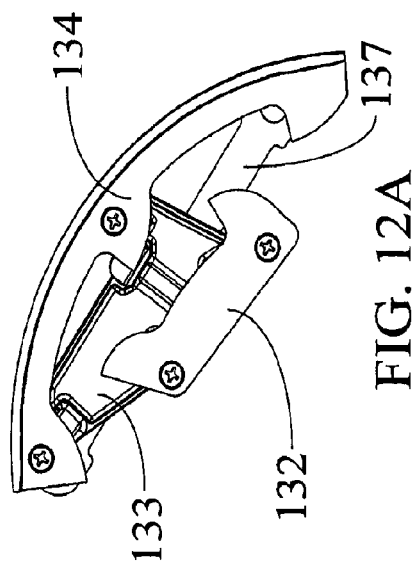
FIG. 12A is a perspective view of an embodiment of a seed singulator and an embodiment of an axial spring.
Figure 12D:
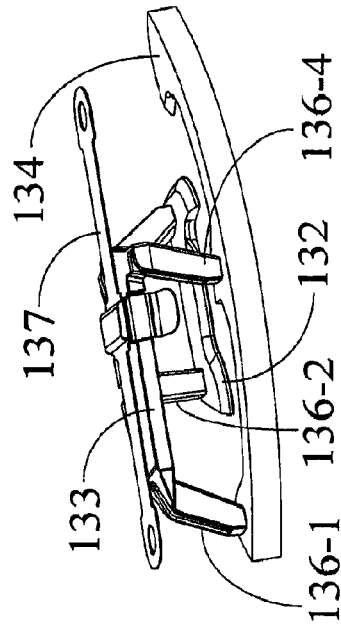
FIG. 12D is another perspective view of an embodiment of a seed singulator and an embodiment of an axial spring.
Figure 12C:
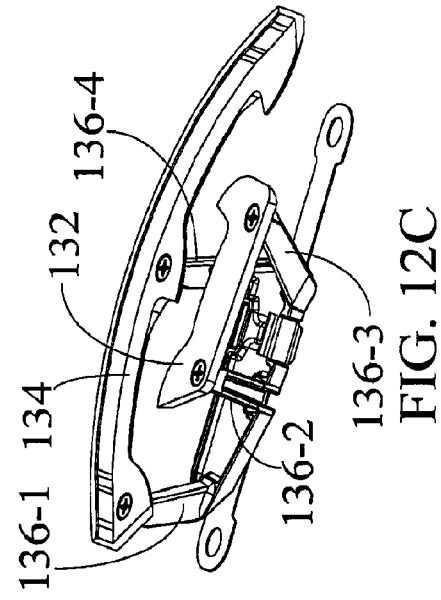
FIG. 12C is another perspective view of an embodiment of a seed singulator and an embodiment of an axial spring.
Figure 13B:
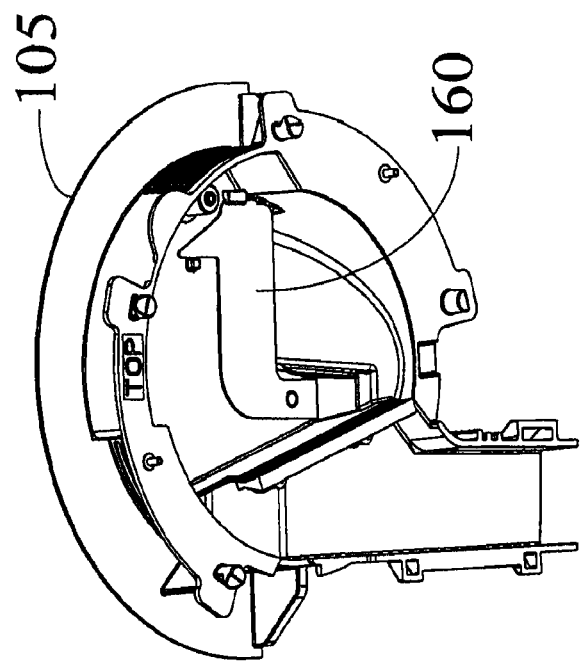
FIG. 13B is another partial perspective view of an embodiment of a seed meter.
Figure 13A:
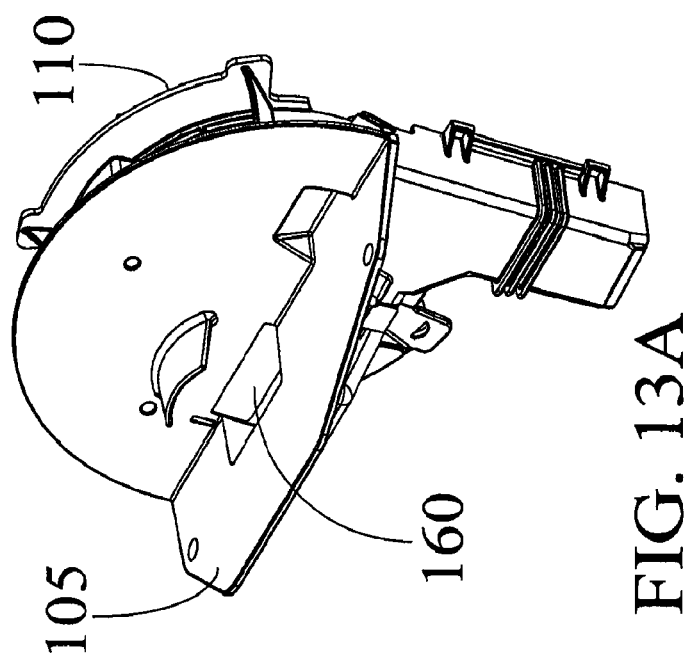
FIG. 13A is another perspective view of an embodiment of a seed meter.

Referring to FIGS. 10 and 11, the seed meter 100 is illustrated with the seed housing 105 and other components removed so that the singulator 130 may be seen in its preferred location biased against the seed-side surface 140 of the seed disc 120. The seed-side surface 140 is preferably normal to the axis of rotation of the seed disc 120. The seed-side surface 140 is also preferably substantially flat with the exception of cavities 128, described in more detail later. For clarity, only the upper and lower lobe plates 132 and 134 are shown in FIG. 11. In operation, the seed disc 120 rotates in the direction indicated by arrow 129 such that the seed apertures 122 travel along a seed aperture path. A portion of the seed aperture path is adjacent to the seed pool area 150. As the seed apertures 122 turn past the seed pool area 150 at the bottom of the seed housing 105, a vacuum side of each seed aperture is placed in fluid communication with the vacuum source such that one or more seeds 42 become entrained over apertures 122. As the seed-bearing apertures rotate between the upper and lower lobe plates 132,134, the lobes of the lobe plates bump, rotate and position the seeds so that only one seed is firmly entrained over the aperture while the other seeds drop back into the seed pool 150, thereby leaving one seed per aperture. After the apertures 122 rotate past the 3 o'clock position as viewed in FIG. 11, the apertures 122 are no longer in communication with the vacuum source resulting in the seeds being released from the apertures and falling into the seed exit 180.

Figure 14:
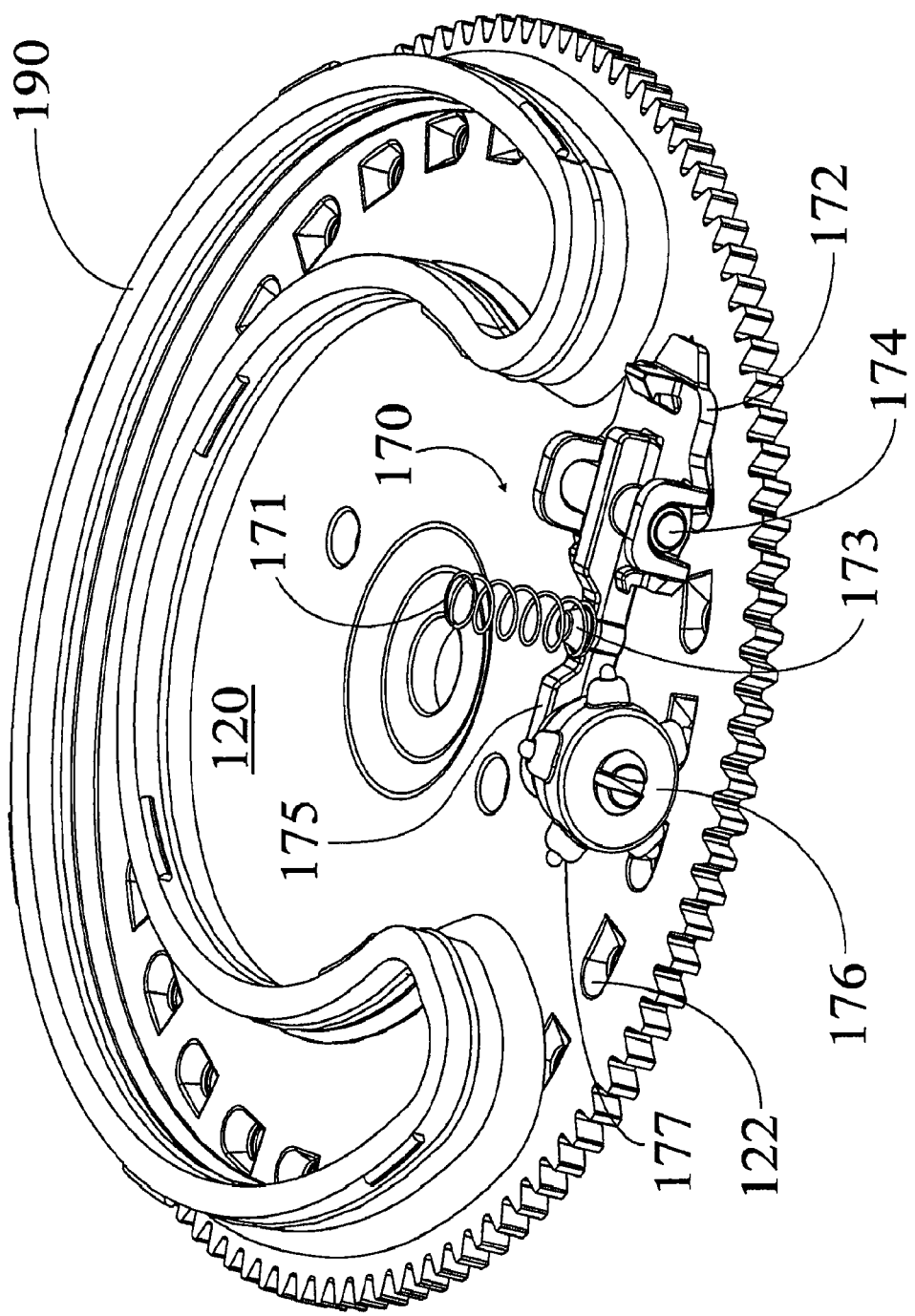
FIG. 14 is a perspective view of a seed disc, vacuum seal and an embodiment of an ejector wheel assembly.
Figure 15:
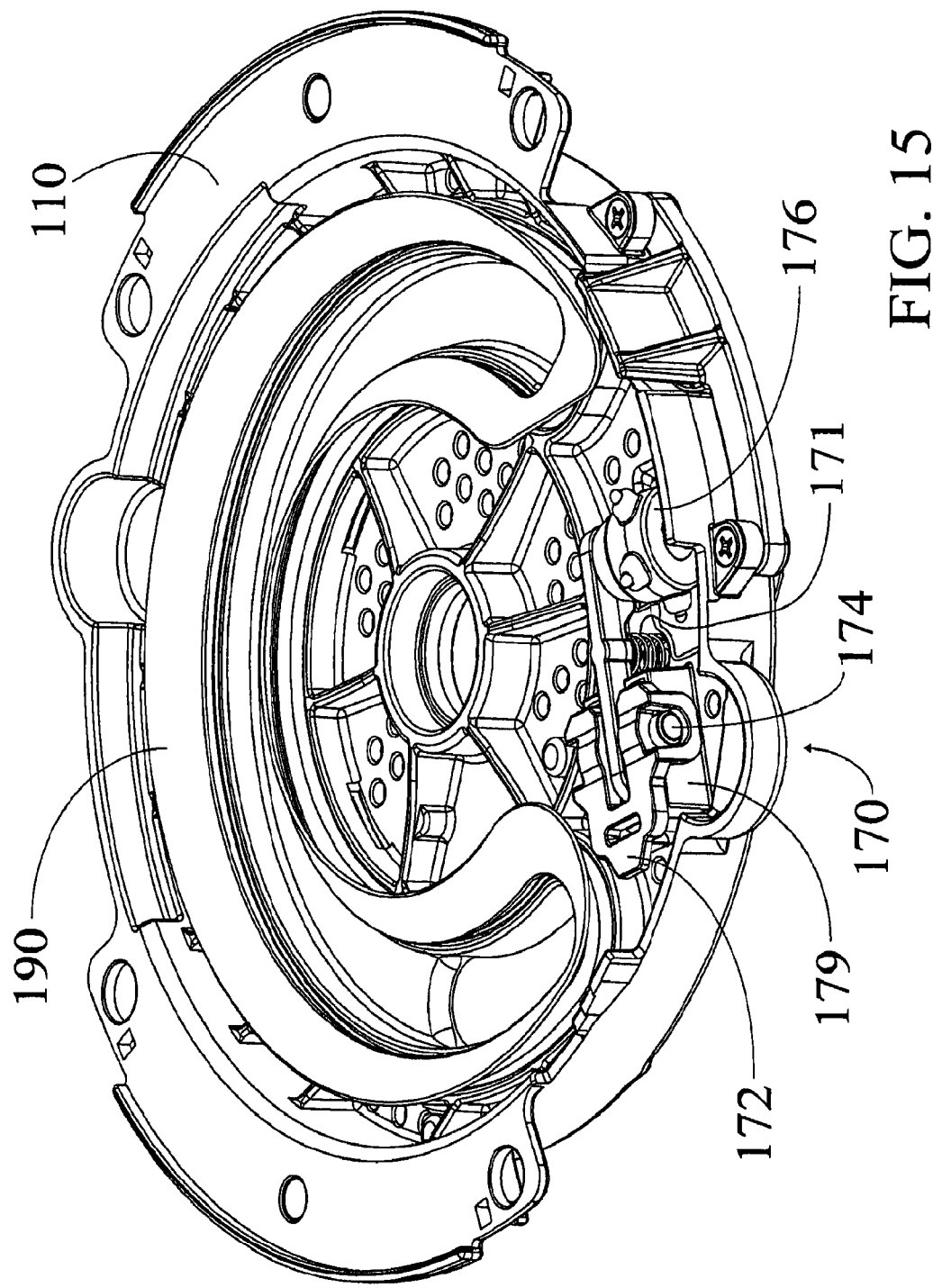
FIG. 15 is a perspective view of a vacuum cover, a vacuum seal, and an embodiment of an ejector wheel assembly.
Figure 16:
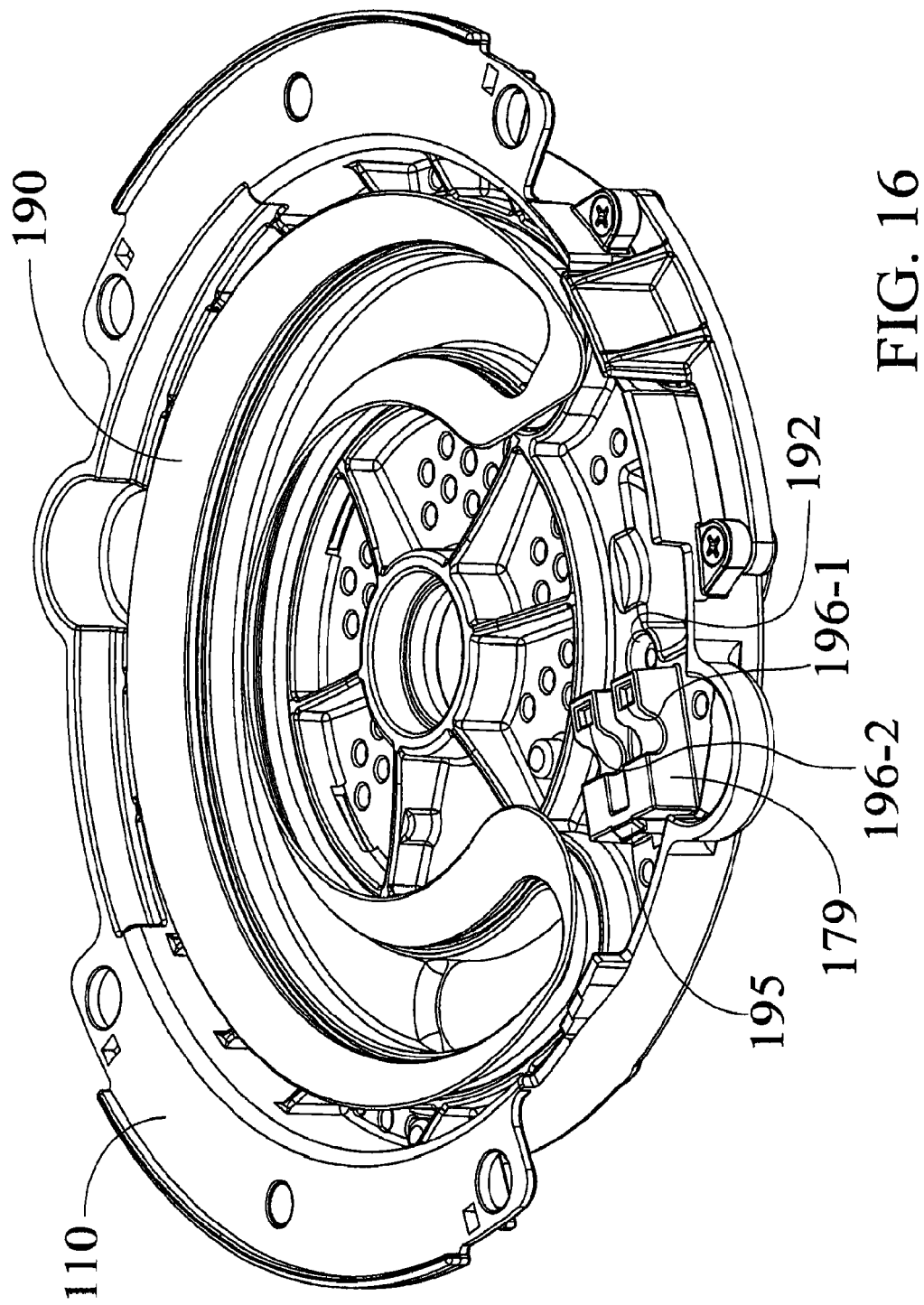
FIG. 16 is a perspective view of a vacuum cover and vacuum seal.

Referring to FIGS. 14-16, the vacuum cover 110 includes a continuous mounting groove into which a vacuum seal 190 is press fit. In operation, the vacuum seal 190 is pressed against the vacuum-side of the seed disc 120 and the interior of the vacuum seal is in communication with the vacuum inlet 115 (FIG. 1) such that as the apertures 122 rotate past the perimeter of the vacuum seal 190 toward its interior they are placed in fluid communication with the vacuum source.

Removable Seed Ejector Assemblies

It has been found that seeds or partial seeds may become lodged in the seed apertures 122 and remain there even after the apertures 122 pass outside of the vacuum seal 190 where no vacuum is imposed. This is undesirable because when the apertures re-enter the seed reservoir an additional seed may not be entrained in an aperture holding a seed or partial seed. Thus, referring again to FIGS. 14-16, a seed ejector assembly 170 is preferably mounted to the vacuum cover 110. The seed ejector assembly 170 includes a shaft 174, a mounting clip 172, a lever arm 175 and an ejector wheel 176 having plungers 177. The ejector wheel 176 is rotatably coupled to the lever arm 175. The lever arm is rotatably coupled to the shaft 174. The shaft is rotatably received within the mounting clip 172. As best seen in FIG. 15, the mounting clip 172 is attached to a mounting port 179, which is preferably formed integrally with the vacuum cover 110. As best seen in FIG. 14, as the seed disc 120 rotates, the ejector wheel 176 rotates and the plungers 177 enter each seed aperture 122, knocking out any seeds, partial seeds or debris in the seed apertures from the back side or vacuum-side of the seed disc 120.

As best illustrated in FIGS. 14 and 15, a spring 171 is preferably disposed between the lever arm 175 and the vacuum cover 110. The spring 171 has a first end held in place at a first end by a knob 173 on the lever arm 175 and has a second end held in place by cavity 192 in the vacuum cover 110. It should be appreciated that the spring 171 biases the ejector wheel 176 against the disc and allows the seed ejector assembly 170 to "float" with deflections or deformations of the seed disc 120.

Figure 17B:
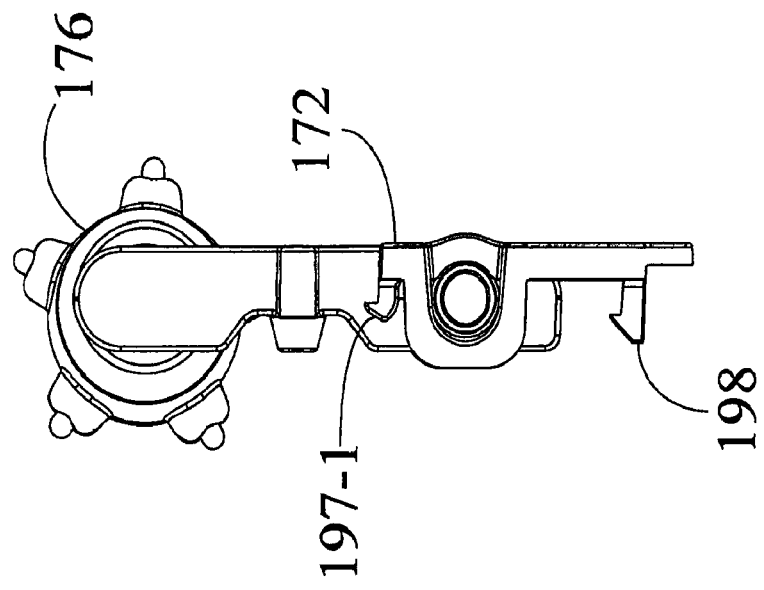
FIG. 17B is a side elevation view of an embodiment of an ejector wheel assembly.
Figure 17A:
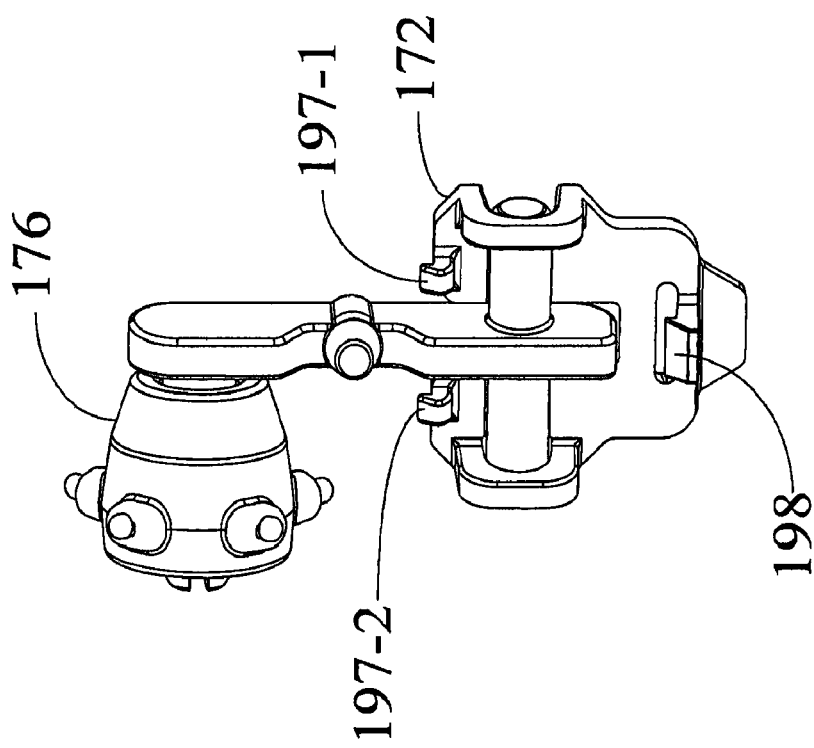
FIG. 17A is a perspective view of an embodiment of an ejector wheel assembly.

It should be appreciated that the user may wish to remove the seed ejector assembly 170 or replace it due to wear on the ejector wheel 176, to install a differently configured seed ejector assembly, or for other reasons. As illustrated in FIGS. 16, 17A and 17B, the mounting clip 172 may be easily removed from and reattached to the mounting port 179 without the use of tools. The mounting port 179 includes apertures 196 and a tab 195. Mounting clip 172 includes rigid hooks 197 and resilient hook 198. During installation, the user first inserts rigid hooks 197 into apertures 196, then preferably presses mounting clip 172 against vacuum cover 110 such that resilient hook 198 deflects around tab 195 and returns to a relaxed state secured around tab 195. It should be appreciated that in addition to deflection of resilient hook 198 with respect to mounting clip 172, the mounting clip 172 also preferably deflects to allow resilient hook 198 to deflect around the tab 195. After attachment, the mounting clip 172 is secured against mounting port 179 until the user removes the mounting clip by bending the mounting clip to release the resilient hook 198 from tab 195 and then moving the rigid hooks 197 free of the apertures 196.

Alternative Ejector Wheel and Disc Embodiments

Turning to FIGS. 18A-18D, a modified seed ejector assembly 270 is illustrated in cooperation with a modified seed disc 220. The seed disc 220 includes an array 224 of apertures 222. The seed disc 220 further includes an array 234 of guide cavities 232. The guide cavity array 234 is preferably substantially concentric with the seed aperture array 224.

Figure 18A:
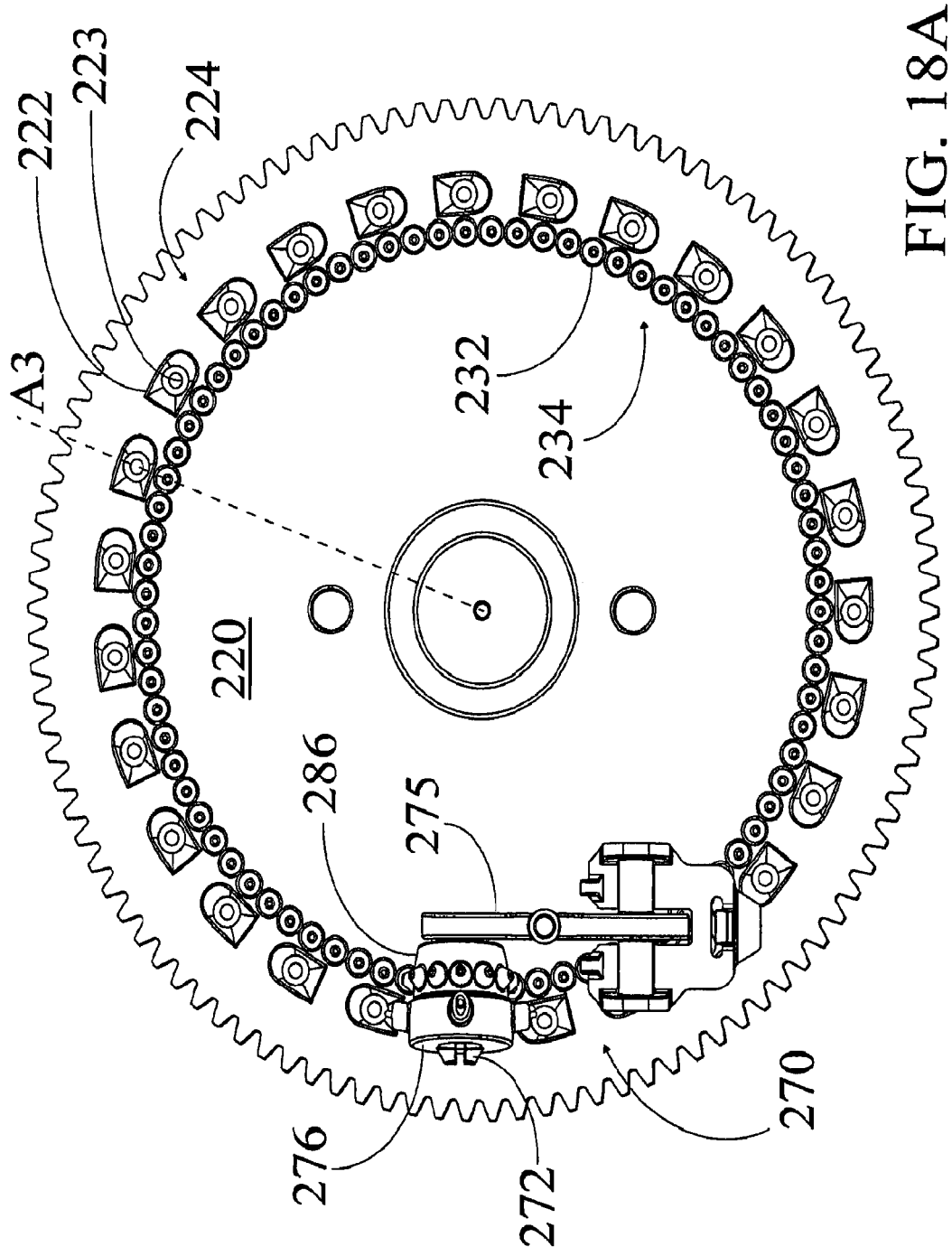
FIG. 18A is a side elevation view of another embodiment of a seed disc and another embodiment of an ejector wheel assembly.
Figure 18D:
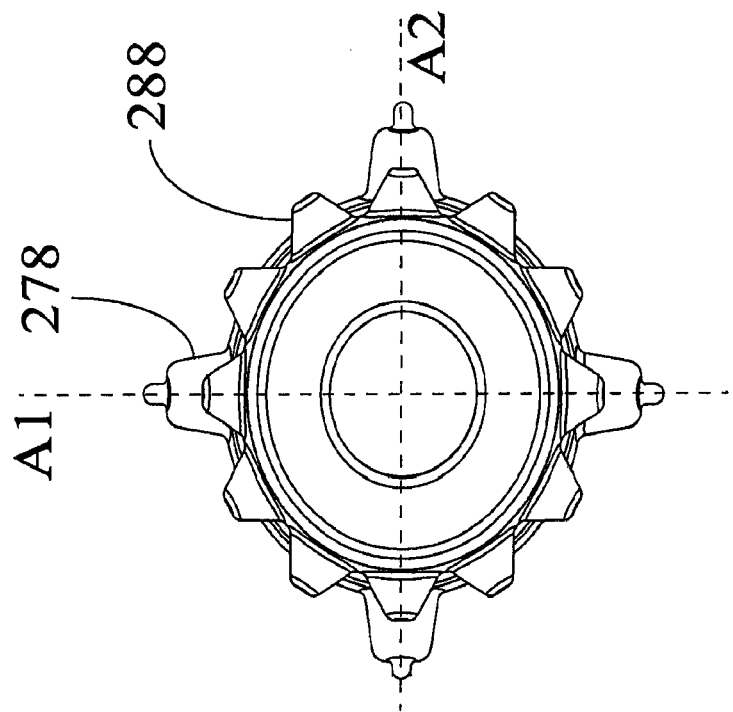
FIG. 18D is a top view of an embodiment of an ejector wheel.
Figure 18C:
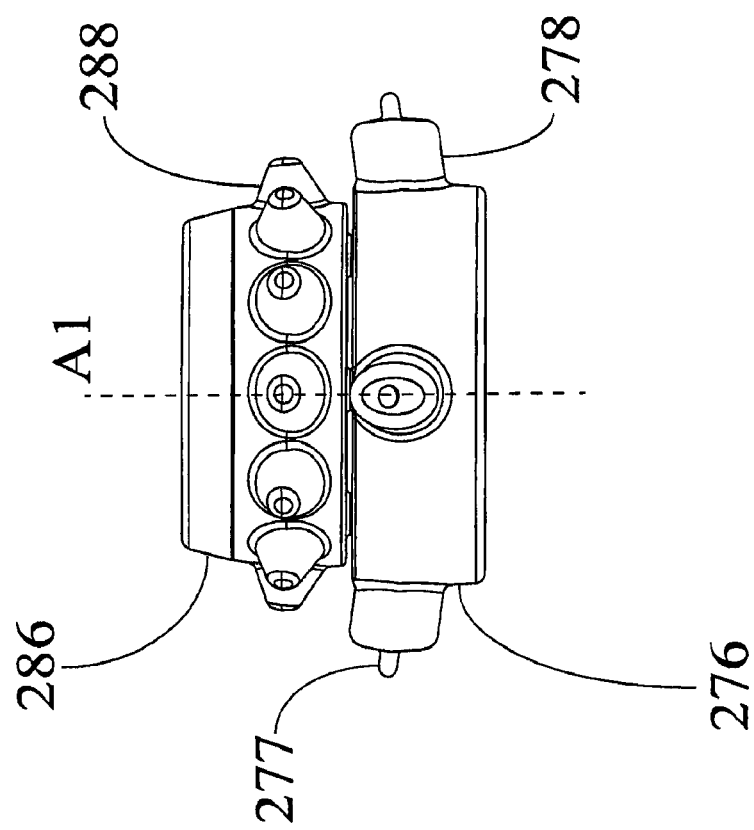
FIG. 18C is a side elevation view of an embodiment of an ejector wheel.

The seed ejector assembly 270 includes a lever arm 275. The lever arm 275 is preferably pivotally biased toward the seed disc 220 as described herein with respect to the lever arm 175. As best illustrated in FIG. 18B, the seed ejector assembly 270 also includes an ejector wheel 276 pivotally mounted to the lever arm 275 and a guide wheel 286 pivotally mounted to the lever arm 275. Continuing to refer to FIG. 18B, the ejector wheel 276 and the guide wheel 286 are preferably pivotally mounted to the lever arm by a retaining pin 272 extending through central apertures in the ejector wheel and guide wheel. The retaining pin 272 preferably allows the ejector wheel 276 and the guide wheel to translate slightly toward and away from the lever arm 275 such that the ejector wheel and guide wheel are allowed to translate radially toward and away from the center of the seed disc 220. As best illustrated in FIGS. 18C and 18D, the ejector wheel 276 includes radially arranged plungers 278 and the guide wheel 286 includes radially arranged guide teeth 288. The seed ejector assembly preferably includes more guide teeth 288 than plungers 278, and preferably includes three guide teeth per plunger. The ejector wheel 276 is preferably fixed to the guide wheel 286 such that the ejector wheel is constrained to rotate synchronously with the guide wheel. Each plunger 278 is preferably aligned with one of the guide teeth 288. For example, as shown in FIG. 18D, the upper and lower plungers 278 are aligned with upper and lower guide teeth along a plane A1 and the left and right plungers 278 are aligned with left and right guide teeth along a plane A2.

In some embodiments of the ejector wheel 276, the plungers 278 include tips 277. In some embodiments of the seed disc 220, the apertures 222 are tapered to small openings 223 (FIG. 18A). The tips 277 are preferably sized to fit within the small openings 223. It should be appreciated that in such embodiments, more precise alignment of the ejector wheel 276 with respect to the seed disc 220 is necessary in order to knock seeds or debris from the small openings 223 without interference between the ejector wheel and seed disc.

In operation, as the disc rotates, the guide teeth 288 sequentially engage the guide cavities 232. The plungers 278 sequentially engage the seed apertures 222. Referring to FIG. 18A, the guide cavity array 234 is aligned with the seed aperture array 224 such that each seed aperture 222 is aligned with a guide cavity 232 along a plane (e.g., plane A3) intersecting the center of the seed disc 220. It should be appreciated that guide teeth 288 engage guide cavities 232 when the plungers 278 are not engaging the seed apertures 222, thus moving the ejector wheel 286 to the proper angular position to successfully engage each seed aperture. Additionally, it should be appreciated that as the ejector wheel translates with respect to the retaining pin 272, the guide teeth 232 likewise retain the ejector wheel 286 at the proper radial distance from the center of the seed disc 220 such that the ejector wheel can successfully engage each seed aperture 222.

Seed Disc Cavities

Figure 19A:
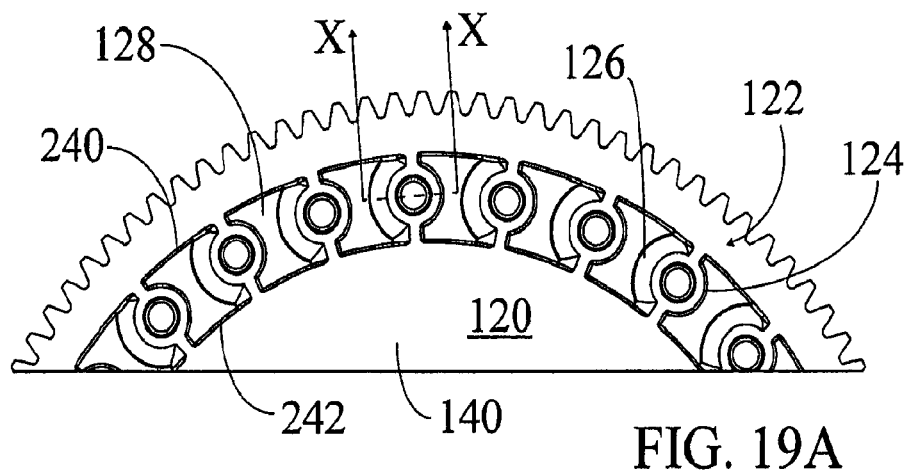
FIG. 19A is a partial side elevation view of an embodiment of seed disc.
Figure 19B:
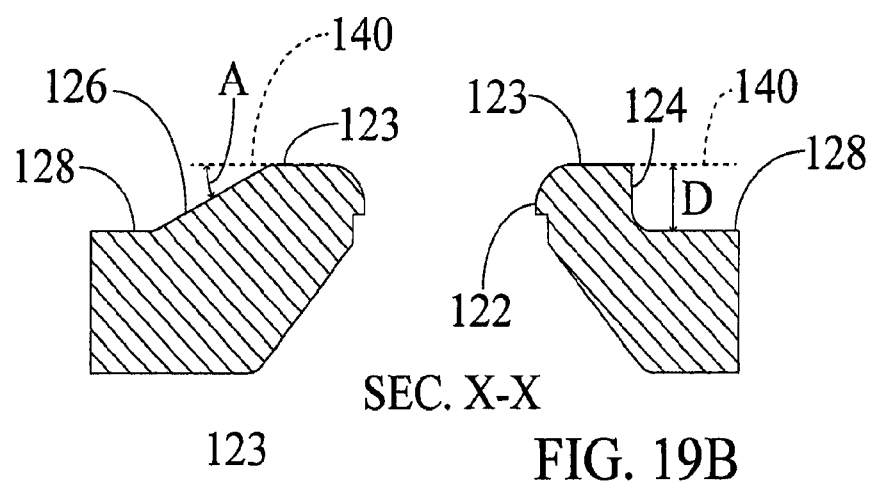
FIG. 19B is a cross-sectional view of a seed disc along the section X-X of FIG. 19A.
Figure 19C:
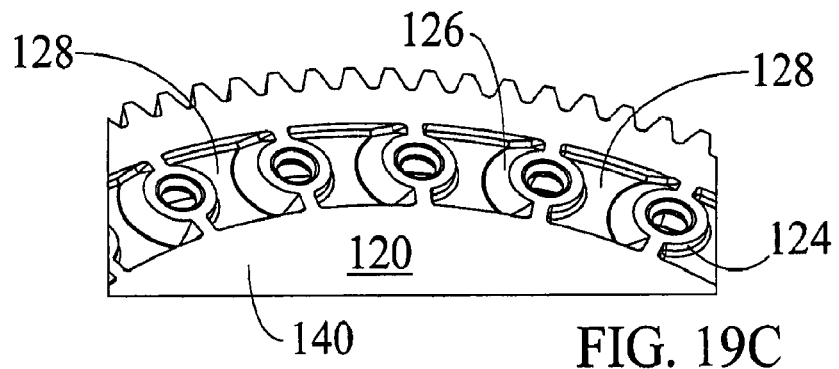
FIG. 19C is a partial perspective view of an embodiment of a seed disc.
Figure 20D:
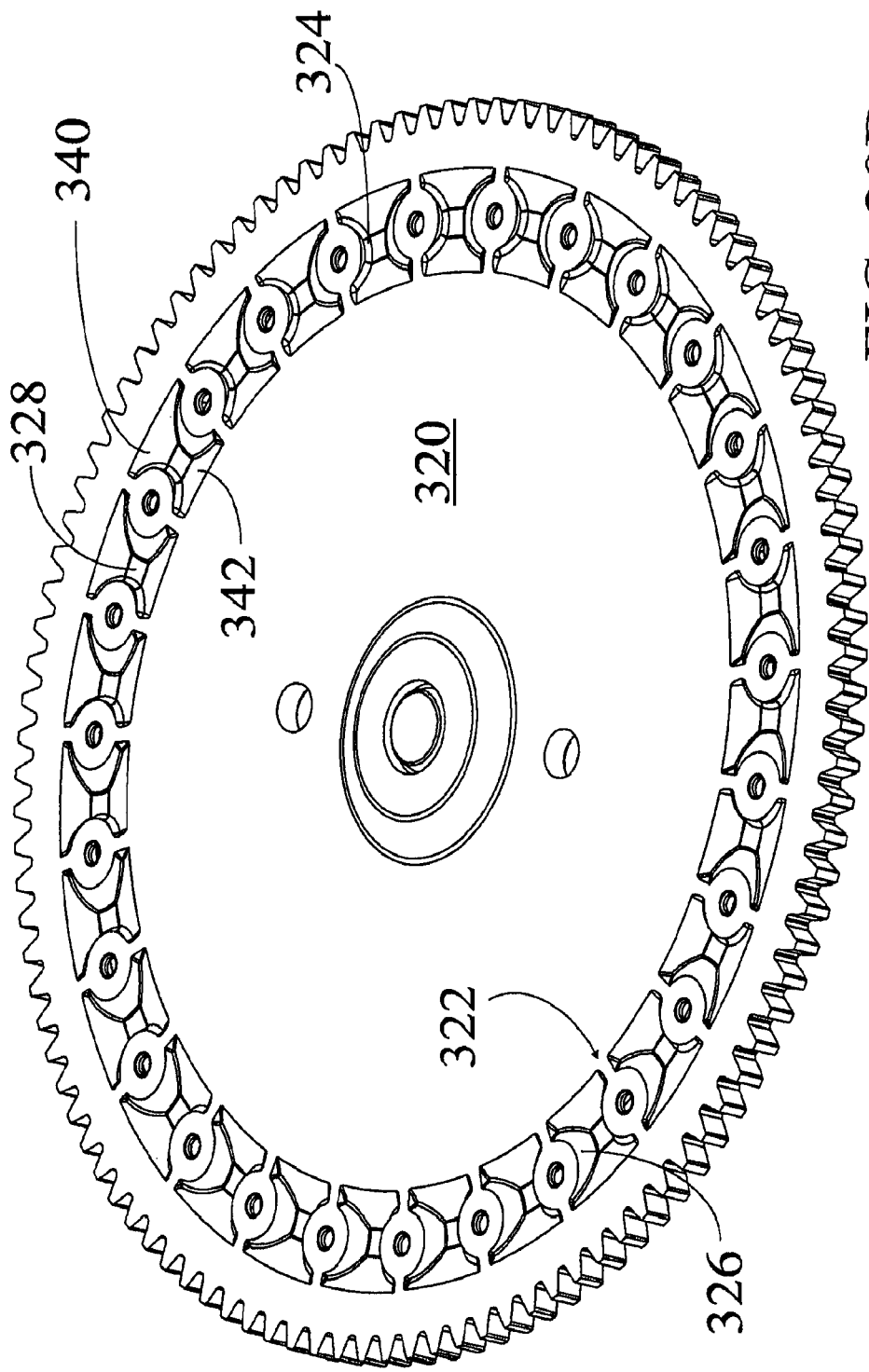
FIG. 20D is a perspective view of an embodiment of a seed disc.

Referring to FIGS. 19A-19C, the seed disc 120 preferably includes seed disc cavities 128 disposed near the radial edge of the seed disc. The cavities 128 are preferably disposed to pass adjacent to the seed pool area 150. Each cavity 128 is preferably disposed forward of an adjacent seed aperture 122 along the direction of travel of the seed aperture path. The cavities 128 are preferably disposed between each pair of seed apertures 122. Seed apertures 122 are preferably substantially normal to the surface 140 of the seed disc 120; i.e., a central axis of each seed aperture 122 is preferably substantially normal to the surface 140 of the seed disc 120. Raised surfaces 123 with respect to the bottom of the associated cavity 128 are preferably disposed between each aperture 122 and the adjacent cavity 128. The upper surface of the raised surfaces 123 are preferably co-planar with the surface 140 of the seed disc 120.

Each cavity 128 preferably comprises an agitation cavity sized to agitate the seeds in the seed pool area 150. Thus the cavities 128 are preferably sized to allow significant movement of seeds 42 into and out of the cavities as each cavity moves adjacent to the seed pool 150. The outer perimeter of the cavity 128 is preferably larger than the outer perimeter of the adjacent seed aperture 122. The area of an intersection between the surface 140 of the seed disc 120 and each cavity 128 is preferably greater than the area of an intersection between the surface 140 and each seed aperture 122. It should be appreciated that each seed aperture is sized to allow limited movement of seeds 42 into the seed aperture. Moreover, the cavities 128 are preferably wider than the average size of seeds 42 to be planted using the seed disc 120. Moreover, the depth D (FIG. 19B) of the cavities 128 is preferably greater than 0.05 inches.

Referring to FIG. 10 in combination with FIG. 19, each cavity 128 preferably has an inner sidewall 242 and an outer sidewall 240 located at distances Ri, Ro respectively from the center C (i.e., the central or rotational axis) of the disc. The difference between the radii Ro and Ri is preferably greater than the diameter of the seed apertures 122. The radius Ro is preferably larger than the distance between the seed aperture and the center of the seed disc 120. The radius Ro is preferably larger than the radius Ra between a distal end of said seed aperture 122 and the center of the disc 120.

In operation, as the seed disc 120 rotates through the seed pool area 150 located to the side of the seed disc (as best illustrated in FIG. 11), seeds move in and out of the cavities 128 such that the seed pool is stirred or agitated. This agitation improves the successful loading of seeds on the seed apertures 122, particularly at relatively high planting speeds which correspond to faster seed disc rotation speeds.

Each cavity 128 preferably includes a sidewall 124 oriented to face the seed pool area 150 as the cavity rotates into the seed pool area. The sidewall 124 is preferably substantially vertical (FIG. 19B), i.e., substantially normal to the surface 140 of the seed disc 120. As viewed along the rotational axis of the seed disc (FIG. 19A), the sidewall 124 is preferably curved, and preferably is semicircular. In operation, the sidewalls 124 sequentially enter the seed pool area 150 and push the seeds such that the seed pool is stirred and agitated.

The cavities 128 preferably include a bevel 126 oriented to face away from the seed pool as the disc 120 rotates into the seed pool area 150. An angle A (FIG. 19B) between bevel 126 and the surface 140 of the seed disc 120 is preferably between 15 and 35 degrees with respect to the surface of the disc. In operation, when seeds are released from the disc (at approximately the 3 o'clock position on the view of FIG. 11), seeds occasionally fall toward the disc and into the cavity 128 located below the seed aperture 122. In such instances, the seed bounces or slides against the bevel 126, smoothly transitioning the seed back out of the cavity 128 and increasing consistency between seed fall times.

Although a seed disc 120 is disclosed herein including series of seed apertures 122 and cavities 128 having the same radial distance from the center of the seed disc, other embodiments include rows of seed cavities Referring to FIGS. 20A-20D, an alternative seed disc 320 is illustrated having cavities 328 disposed between seed apertures 322. Each cavity 328 preferably includes vertical sidewalls 324 and bevels 326. Each cavity 328 preferably includes a beveled inner sidewall 342 and a beveled outer sidewall 340. The beveled sidewalls 342, 340 reduce the interior volume of the cavity 328 and allow seeds to smoothly transition out of the cavity 328 while the seeds are being agitated in the seed pool area 150. Thus each beveled sidewall 342, 340 discourages entrapment of seeds in the cavities 328, particularly smaller seed varieties.

Although the various improvements described herein are illustrated with respect to a vacuum-type seed meter, they would be equally applicable to other seed singulating meters, including positive-air meters such as that disclosed in U.S. Pat. No. 4,450,979 to Deckler, incorporated herein in its entirety by reference.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A seed meter for an agricultural planter, comprising:
a meter housing including a seed housing;
an opening for communicating seeds into said seed housing;
a seed pool area for collection of said seeds disposed near a bottom end of said seed housing; and
a seed disc rotatably mounted within said meter housing, said seed disc being disposed horizontally adjacent to said seed pool area, said seed disc further including a plurality of seed apertures, said seed apertures disposed to rotate along a seed aperture path, a portion of said seed aperture path being adjacent to said seed pool area, said seed disc further having a plurality of cavities disposed along said seed aperture path, wherein each of said cavities has an outer perimeter larger than an outer perimeter of said seed apertures, wherein a central axis of each of said seed apertures is outside of an outer perimeter of said cavities, said central axis being substantially normal to a surface of said seed disc, said surface generally defining a seed side of said seed disc, wherein said cavities include a bevel, said bevel oriented to face away from said seed pool area as said cavities become adjacent to said seed pool area.

2. The seed meter of claim 1, wherein said cavities comprise agitation cavities sized to allow said seeds in said seed pool area to move substantially into said cavity such that said cavities substantially agitate the seeds in said seed pool area.

3. The seed meter of claim 2, wherein said cavities comprise a substantially vertical sidewall, said sidewall oriented to face said seed pool area as said cavity enters said seed pool area.

4. The seed meter of claim 1, wherein a distal end of said seed apertures is disposed at a first radial distance from a center of said seed disc, and wherein said cavities include an outer sidewall disposed at a second radial distance from said center of said seed disc, and wherein said second radial distance is larger than said first radial distance.

5. The seed meter of claim 4, wherein said cavities include an inner sidewall disposed at a third radial distance from center of said seed disc, and wherein said third radial distance is smaller than said first radial distance.

6. The seed meter of claim 1, wherein an area of an intersection between a surface of said seed disc and said cavity is greater than the area of an intersection between said surface and one of said seed apertures.

7. The seed meter of claim 1, wherein said seed disc further includes a raised surface disposed between each of said cavities and a nearest one of said seed apertures.

8. The seed meter of claim 2, wherein said seed disc further includes a raised surface disposed between each of said cavities and a nearest one of said seed apertures.

9. The seed meter of claim 1, wherein said cavities are wider than the seeds in the seed pool along a plane normal to said seed disc, wherein said plane intersects a central axis of said seed disc.

10. A seed meter for an agricultural planter, comprising:
a meter housing including a seed housing;
an opening for communicating seeds into said seed housing;
a seed pool area for collection of said seeds disposed near a bottom end of said seed housing;
a seed disc rotatably mounted within said meter housing, said seed disc having a substantially flat seed side surface, said seed disc being located to the side of said seed pool area; and
a singulator having multiple singulator surfaces, said singulator surfaces being co-planar, said singulator surfaces contacting said seed side surface,
wherein said seed disc includes at least four seed apertures disposed to rotate along a seed aperture path, a portion of said seed aperture path being adjacent to said seed pool area;
wherein said seed disc further includes at least four cavities, each of said cavities disposed along said seed aperture path and sized to allow seeds in said seed pool area to substantially enter said cavities, and wherein a central axis of each of said seed apertures is outside of an outer perimeter of said cavities, said central axis being substantially normal to a surface of said seed disc, said surface generally defining a seed side of said seed disc; and
wherein said cavities include a bevel, said bevel oriented to face away from said seed pool area as said cavities become adjacent to said seed pool area.

11. The seed meter of claim 10, wherein each of said cavities includes a first sidewall oriented to face said seed pool area as each of said cavities enters said seed pool area, said first sidewall being substantially normal to the seed side surface of said disc.

12. The seed meter of claim 11, wherein said first sidewall is curved.

13. The seed meter of claim 11, further including a raised surface disposed between said first sidewall and one of said seed apertures.

14. The seed meter of claim 13, wherein said raised surface is substantially co-planar with said seed side surface.

* * * * *